(12) United States Patent
Ryu

(10) Patent No.: US 9,605,103 B2
(45) Date of Patent: *Mar. 28, 2017

(54) PROCESS FOR PRODUCING PHOTOCHROMIC OPTICAL MATERIAL

(71) Applicant: MITSUI CHEMICALS, INC., Minato-ku, Tokyo (JP)

(72) Inventor: Akinori Ryu, Arao (JP)

(73) Assignee: MITSUI CHEMICALS, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/909,361

(22) PCT Filed: Aug. 1, 2014

(86) PCT No.: PCT/JP2014/070403
§ 371 (c)(1),
(2) Date: Feb. 1, 2016

(87) PCT Pub. No.: WO2015/016364
PCT Pub. Date: Feb. 5, 2015

(65) Prior Publication Data
US 2016/0194429 A1    Jul. 7, 2016

(30) Foreign Application Priority Data

Aug. 2, 2013 (JP) .................... 2013-161742

(51) Int. Cl.
| C08F 2/38 | (2006.01) |
| C08F 24/00 | (2006.01) |
| C08F 290/06 | (2006.01) |
| C09K 9/02 | (2006.01) |
| G02B 5/23 | (2006.01) |
| G02C 7/10 | (2006.01) |
| G02B 1/04 | (2006.01) |

(52) U.S. Cl.
CPC ............. *C08F 290/06* (2013.01); *C09K 9/02* (2013.01); *G02B 1/041* (2013.01); *G02B 5/23* (2013.01); *G02C 7/102* (2013.01); *G02B 1/04* (2013.01)

(58) Field of Classification Search
CPC ......... C09K 9/02; C08F 290/06; G02C 7/102; G02B 5/23; G02B 1/041; G02B 1/04; C08L 45/00; C08L 2666/70
USPC .................................................. 526/75, 268
See application file for complete search history.

(56) References Cited

U.S. PATENT DOCUMENTS

| 5,683,628 A | 11/1997 | Mizuno et al. |
| 5,973,039 A | 10/1999 | Florent et al. |
| 6,262,155 B1 | 7/2001 | Florent et al. |
| 6,399,682 B2 | 6/2002 | Florent et al. |
| 6,417,273 B1 | 7/2002 | Koinuma et al. |
| 6,506,538 B1 | 1/2003 | Breyne et al. |
| 6,669,873 B1 | 12/2003 | Smith et al. |
| 6,777,494 B1* | 8/2004 | Yang .................. C08G 18/3876 252/182.17 |
| 7,332,260 B2 | 2/2008 | Breyne et al. |
| 7,999,989 B2 | 8/2011 | Asai et al. |
| 8,017,720 B2 | 9/2011 | Bojkova et al. |
| 8,193,303 B2 | 6/2012 | Itoh et al. |
| 8,815,388 B2 | 8/2014 | Yamazaki et al. |
| 2001/0020061 A1 | 9/2001 | Florent et al. |
| 2002/0197562 A1 | 12/2002 | Breyne et al. |
| 2005/0062932 A1 | 3/2005 | Kosaka et al. |
| 2007/0142605 A1 | 6/2007 | Bojkova et al. |
| 2009/0316246 A1 | 12/2009 | Asai et al. |
| 2010/0093970 A1 | 4/2010 | Kosaka et al. |
| 2010/0137555 A1 | 6/2010 | Itoh et al. |
| 2013/0116362 A1 | 5/2013 | Yamazaki et al. |
| 2014/0316033 A1 | 10/2014 | Yamazaki et al. |
| 2016/0170107 A1* | 6/2016 | Ryu ....................... C09K 9/02 252/586 |

FOREIGN PATENT DOCUMENTS

| JP | 8-72036 A | 10/1996 |
| JP | 9-324023 A | 12/1997 |
| JP | 11-511765 A | 10/1999 |
| JP | 2001-302755 A | 10/2001 |
| JP | 2002-241464 A | 8/2002 |
| JP | 2004-78052 A | 3/2004 |
| JP | 2004-511578 A | 4/2004 |
| JP | 2005-23238 A | 1/2005 |
| JP | 2005-121679 A | 5/2005 |
| JP | 2008-30439 A | 2/2008 |
| JP | 2009-520258 A | 5/2009 |
| JP | 2011-144181 A | 7/2011 |
| WO | WO 00/73365 A1 | 12/2000 |
| WO | WO 2008/136401 A1 | 11/2008 |
| WO | WO 2011/162293 A1 | 12/2011 |

OTHER PUBLICATIONS

International Search Report (PCT/ISA/210) issued on Nov. 11, 2014, by the Japanese Patent Office as the International Searching Authority for International Application No. PCT/JP2014/070403.
Office Action issued by the Chinese Patent Office in corresponding Chinese Patent Application No. 201480042190.1 on Aug. 30, 2016 (15 pages including partial English translation).

* cited by examiner

Primary Examiner — William Cheung
(74) Attorney, Agent, or Firm — Buchanan, Ingersoll & Rooney PC

(57) ABSTRACT

The process for producing photochromic optical materials of the present invention includes a step (i) of reacting at least one polymerizable monomer (A) having two or more ethylene-based unsaturated groups with at least one polythiol (B) having two or more mercapto groups to obtain a prepolymer; a step (ii) of mixing the prepolymer and a photochromic compound (C) to obtain a polymerizable composition; and a step (iii) of polymerizing the polymerizable composition, wherein, before the reaction of the step (i), the molar number of the mercapto groups included in the polythiol (B) is smaller than the molar number of the ethylene-based unsaturated groups included in the polymerizable monomer (A).

15 Claims, No Drawings

PROCESS FOR PRODUCING PHOTOCHROMIC OPTICAL MATERIAL

This application is a U.S. National stage application of International Application No. PCT/JP2014/070403, filed on Aug. 1, 2014, which claims the benefit of Japanese Patent Application Nos. JP2013-161742, filed on Aug. 2, 2013, the entire contents of which are hereby incorporated herein by reference.

TECHNICAL FIELD

The present invention relates to a process for producing a photochromic optical material and an optical material obtained using the same.

BACKGROUND ART

Since plastic lenses are light, not easily cracked, and can be stained in comparison to inorganic lenses, plastic lenses have been rapidly distributed as optical elements such as spectacle lenses and camera lenses, and hitherto, a variety of resins for spectacle lenses have been developed and used. Among these, representative examples include an allyl resin obtained from diethylene glycol bisallyl carbonate and diallyl isophthalate, a (meth)acrylic resin obtained from (meth)acrylate, and a polythiourethane resin obtained from isocyanate and thiol.

In recent years, plastic photochromic lenses through application of organic photochromic dyes are commercially available as glasses. As the process for producing photochromic lenses, a method in which a photochromic compound is dissolved in a monomer mixed liquid for lens in advance, the resultant product is injected into a mold, and polymerized, as a result, a photochromic lens is obtained is exemplified.

Patent Document 1 describes that by combining a specific aromatic (meth)acrylic acid ester and an aromatic vinyl, favorable light adjusting performance is obtained.

Patent Document 2 describes a lens formed of a composition including a predetermined photochromic compound and a di(meth)acrylate compound. In paragraph [0009], it is described that in a case where a urethane resin or a thiourethane resin having a high refractive index is used, isocyanate which is a resin raw material in a monomer state reacts with the photochromic compound, and due to this, photochromic performance is completely eliminated.

Patent Document 3 discloses a lens obtained by providing a coating layer formed of a composition including a photochromic compound having a chromene skeleton and a phenol compound on a surface of a thiourethane-based plastic lens.

Patent Document 4 discloses a photochromic lens having a lens substrate formed of a thiourethane resin and a photochromic film formed by applying a solution including a photochromic compound and a radically polymerizable monomer on the substrate.

Patent Document 5 discloses a compound having photochromic characteristics.

Patent Document 6 describes a method of producing a photochromic optical material by curing a monomer composition including a photochromic compound, a polythiol, and a polyisocyanate.

Patent Document 7 discloses an optical resin composition containing a thiol-ene prepolymer.

RELATED DOCUMENT

Patent Document

[Patent Document 1] PCT Japanese Translation Patent Publication No. 11-511765

[Patent Document 2] Japanese Unexamined Patent Publication No. 8-272036

[Patent Document 3] Japanese Unexamined Patent Publication No. 2005-23238

[Patent Document 4] Japanese Unexamined Patent Publication No. 2008-30439

[Patent Document 5] Japanese Unexamined Patent Publication No. 2011-144181

[Patent Document 6] Japanese Unexamined Patent Publication No. 2004-78052

[Patent Document 7] PCT Japanese Translation Patent Publication No. 2004-511578

SUMMARY OF THE INVENTION

The techniques described in the above-described Patent Documents have points to be improved in the following respects.

As the methods disclosed in Patent Documents 1, 2, and 6, a method of dissolving a photochromic compound in a composition liquid in advance is preferable as a process in which the number of step in the production is small since light adjusting performance is imparted with molding at the same time, and is extremely useful as a method of mass-producing a molded product with stable quality since the photochromic compound can be easily homogeneously dispersed into a substrate. However, the lens obtained in Patent Document 1 or 2 has a refractive index of about 1.55 to 1.57, and thus, the lens needs to be improved in the refractive index. In addition, the lens described in Patent Document 6 needs to be improved in light adjusting characteristics.

The process described in Patent Document 7 is a method in which prepolymerization is performed when a lens substrate is produced. The lens needs to be improved in the refractive index, and the balance between light adjusting characteristics and optical properties.

In addition, in the photochromic optical material obtained in the techniques described above, the desired photochromic performance could not be exhibited in some cases, and the inventors have performed thorough studies on an industrial process in order to provide a photochromic optical material which has a high refractive index and is excellent in light adjusting characteristics.

As a result of thorough studies in order to solve the above problems, the present inventors found that a process in which a prepolymer is obtained using a polymerizable monomer (A) having two or more ethylene-based unsaturated groups and a polythiol (B) having two or more mercapto groups, and then, using a polymerizable composition obtained by mixing the prepolymer and a photochromic compound can obtain an optical material which has stable photochromic performance and is excellent in optical properties is produced, and completed the present invention.

That is, the invention is as follows.

[1] The process for producing photochromic optical materials, including a step (i) of reacting at least one polymerizable monomer (A) having two or more ethylene-based unsaturated groups with at least one polythiol (B) having two or more mercapto groups to obtain a prepolymer;

a step (ii) of mixing the prepolymer and a photochromic compound (C) to obtain a polymerizable composition; and a step (iii) of polymerizing the polymerizable composition, wherein, before the reaction of the step (i), the molar number of the mercapto groups included in the polythiol (B) is smaller than the molar number of the ethylene-based unsaturated groups included in the polymerizable monomer (A).

[2] The process for producing photochromic optical materials according to [1], in which, before the reaction of the step (i), the molar number of the mercapto groups included in the polythiol (B) is equal to or less than 0.3 times with respect to the molar number of the entirety of ethylene-based unsaturated groups included in the polymerizable monomer (A).

[3] The process for producing photochromic optical materials according to [1] or [2], in which the polymerizable monomer (A) includes at least one ethylene-based unsaturated polymerizable monomer (a1) having two or more vinyl groups or isopropenyl groups and/or at least one ethylene-based unsaturated polymerizable monomer (a2) having two or more (meth)acrylic groups.

[4] The process for producing photochromic optical materials according to anyone of [1] to [3], in which, in the step (i) or (ii), an ethylene-based unsaturated polymerizable monomer having one (meth)acrylic group is included.

[5] The process for producing photochromic optical materials according to any one of [1] to [4], in which, in the step (i), the polymerizable monomer (A) reacts with the polythiol (B) in the presence of a phosphine-based compound.

[6] The process for producing photochromic optical materials according to any one of [1] to [5], in which the step (ii) is a step of mixing the prepolymer, the photochromic compound (C), and an azo-based compound.

[7] The process for producing photochromic optical materials according to [6], in which the step (iii) is a step of polymerizing the polymerizable composition in the presence of an azo-based compound.

[8] The process for producing photochromic optical materials according to [3], in which the polymerizable monomer (a1) is at least one selected from divinylbenzene, diisopropenylbenzene, trivinylbenzene, and divinylnaphthalene.

[9] The process for producing photochromic optical materials according to [3], in which the polymerizable monomer (a2) is at least one selected from polymerizable monomers represented by the following general formula (4);

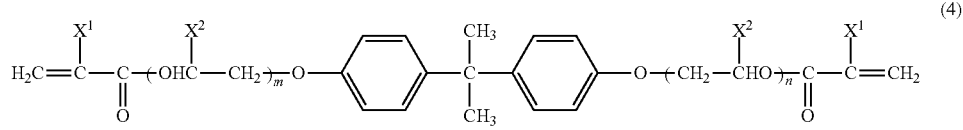

(4)

wherein, in formula (4), each of m and n is 0 or greater number, and m and n satisfy m+n=0 to 50; $X^1$ is a hydrogen atom or a methyl group, and a plurality of $X^1$ may be the same as or different from each other; $X^2$ is a hydrogen atom or an alkyl group having 1 or 2 carbon atoms, and a plurality of $X^2$ may be the same as or different from each other.

[10] The process for producing photochromic optical materials according to [4], in which the ethylene-based unsaturated polymerizable monomer (D) is at least one selected from aromatic (meth)acrylic acid esters represented by the following general formula (5);

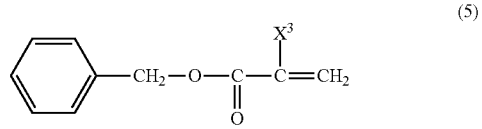

(5)

wherein, in formula (5), $X^3$ is a hydrogen atom or a methyl group.

[11] The process for producing photochromic optical materials according to any one of [1] to [10], in which the polythiol (B) is at least one selected from the group consisting of 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[12] The process for producing photochromic optical materials according to any one of [1] to [11], in which the photochromic compound (C) is represented by the following general formula (7) or (8);

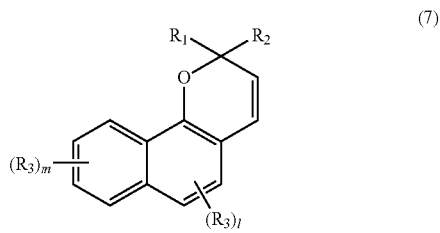

(7)

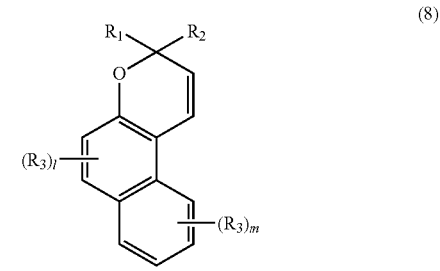

(8)

wherein, in formulas (7) and (8), $R_1$ and $R_2$ may be the same as or different from each other, and each of $R_1$ and $R_2$ independently represents a hydrogen atom;

a linear or branched alkyl group having 1 to 12 carbon atoms;

a cycloalkyl group having 3 to 12 carbon atoms;

a substituted or unsubstituted aryl group having 6 to 24 carbon atoms or a substituted or unsubstituted heteroaryl group having 4 to 24 carbon atoms, wherein the substituted aryl group or the substituted heteroaryl group, as a substituent, has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, an —$NH_2$ group, an —NHR group, a —$N(R)_2$ group, wherein R is a linear or branched alkyl group having 1 to 6 carbon atoms, and in a case where two Rs are present, the two Rs may be the same as or different from each other,
a methacryloyl group, and an acryloyl group; or
an aralkyl or heteroaralkyl group which is formed by substituting a linear or branched alkyl group having 1 to 4 carbon atoms with an aryl group or a heteroaryl group,
$R_3$s may be the same as or different from each other, and each $R_3$s independently represents
a halogen atom;
a linear or branched alkyl group having 1 to 12 carbon atoms;
a cycloalkyl group having 3 to 12 carbon atoms;
a linear or branched alkoxy group having 1 to 12 carbon atoms;
a linear or branched haloalkyl group having 1 to 12 carbon atoms which is substituted with at least one halogen atom, a linear or branched halocycloalkyl group having 3 to 12 carbon atoms which is substituted with at least one halogen atom, a linear or branched haloalkoxy group having 1 to 12 carbon atoms which is substituted with at least one halogen atom;
an aryl group having 6 to 24 carbon atoms or a heteroaryl group having 4 to 24 carbon atoms which is substituted or unsubstituted,
wherein the substituted aryl group or the substituted heteroaryl group has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group as a substituent;
an aralkyl or heteroaralkyl group which is formed by substituting a linear or branched alkyl group having 1 to 4 carbon atoms with the aryl group or the heteroaryl group;
a substituted or unsubstituted phenoxy or naphthoxy group, wherein the substituted phenoxy or the substituted naphthoxy group has at least one substituent selected from a linear or branched alkyl group or alkoxy group having 1 to 6 carbon atoms as a substituent;
—$NH_2$, —NHR, —$CONH_2$, or —CONHR, wherein R is a linear or branched alkyl group having 1 to 6 carbon atoms; or
—$OCOR_8$ or —$COOR_8$, wherein $R_8$ is a linear or branched alkyl group having 1 to 6 carbon atoms, a cycloalkyl group having 3 to 6 carbon atoms, or a phenyl group which is substituted with at least one substituent of a substituted aryl group or a substituted heteroaryl group in $R_1$ and $R_2$ or an unsubstituted phenyl group, and
one or more aromatic ring groups or non-aromatic ring groups are formed by bonding of at least two adjacent $R_3$s to each other and by including the carbon atom to which $R_3$ is bonded, wherein the aromatic ring group or non-aromatic ring group includes one ring or two annelated rings which may include a heteroatom selected from the group consisting of oxygen, sulfur, and nitrogen;
l is an integer 0 to 2; and
m is an integer 0 to 4.

[13] The process for producing photochromic optical materials according to [12], in which the photochromic compound (C) is represented by the following general formula (9)

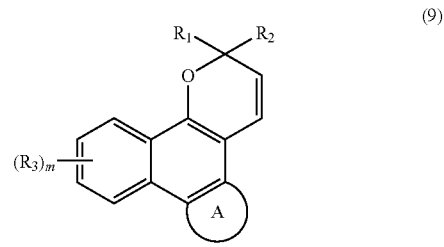

wherein, in formula (9), each of $R_1$, $R_2$, and $R_3$ has the same meaning as that in formula (7);
A represents an annelated ring represented by the above formula ($A_2$) or ($A_4$);

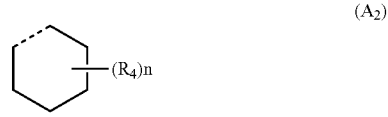

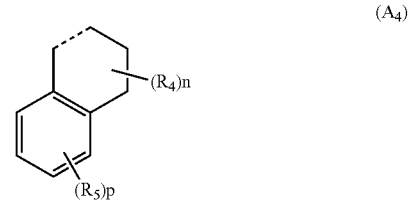

wherein, in these annelated rings, a dotted line represents a $C_5$-$C_6$ bond of the naphthopyran ring in general formula (9);
an α bond of an annelated ring ($A_4$) can be normally bonded to the $C_5$ or $C_6$ of the naphthopyran ring in general formula (9);
$R_4$'s are the same as or different from each other, and each $R_4$'s independently represents OH or an linear or branched alkyl group or alkoxy group having 1 to 6 carbon atoms, or two $R_4$'s form a carbonyl group (CO);
$R_5$ represents a halogen atom;
a linear or branched alkyl group having 1 to 12 carbon atoms;
a linear or branched haloalkyl group having 1 to 6 carbon atoms which is substituted with at least one halogen atom;
a cycloalkyl group having 3 to 12 carbon atoms;
a linear or branched alkoxy group having 1 to 6 carbon atoms;
a substituted or unsubstituted phenyl or benzyl group, wherein the substituted phenyl or the substituted benzyl group has at least one of substituents described above in the definition of $R_1$ and $R_2$ groups as a substituent in a case where each of $R_1$ and $R_2$ groups in general formula (9) independently corresponds to an aryl or heteroaryl group;
—$NH_2$ or —NHR, wherein R is a linear or branched alkyl group having 1 to 6 carbon atoms;
a substituted or unsubstituted phenoxy or naphthoxy group, wherein the substituted phenoxy or the substituted naphthoxy group has at least a linear or branched alkyl group or alkoxy group having 1 to 6 carbon atoms as a substituent; or a —COR$_9$, —COOR$_9$, or —CONHR$_9$ group, wherein R$_9$ represents a linear or branched alkyl group having 1 to 6 carbon atoms, a cycloalkyl group having 3 to 6 carbon atoms, or a substituted or unsubstituted phenyl or benzyl group, wherein the substituted phenyl or the substituted benzyl group has at least one of substituents described above in the definition of R$_1$ and R$_2$ groups as a substituent in a case where each of R$_1$ and R$_2$ groups in general formula (9) independently corresponds to an aryl or heteroaryl group; and in a case where A represents (A$_4$), n is an integer of 0 to 2, p is an integer of 0 to 4, and in a case where A represents (A$_2$), n is an integer of 0 to 2.

[14] A photochromic optical material obtained by the process according to any one of [1] to [13].

[15] A plastic lens formed of the optical material according to [14].

According to the process for producing photochromic optical materials of the present invention, it is possible to industrially stably obtain a photochromic optical material which has a high refractive index and is excellent in light adjusting characteristics, from a polymerizable composition including at least one polymerizable monomer (A) having two or more ethylene-based unsaturated groups, at least one polythiol (B) having two or more mercapto groups, and a photochromic compound (C). AS the result, the process of the present invention can improve production stability of photochromic optical materials. In particular, in the production step, by obtaining a polymerizable composition by performing a prepolymerization step under specific conditions and by mixing the prepolymer and a photochromic compound, it is possible to industrially produce a photochromic optical material which has a high refractive index and is excellent in light adjusting characteristics.

Each component used in the present invention will be described below.

[Polymerizable Monomer (A)]

The polymerizable monomer (A) may have two or more ethylene-based unsaturated groups (two or more radical polymerizable ethylene-base unsaturated groups), and for example, at least one ethylene-based unsaturated polymerizable monomer (a1) having two or more vinyl groups or isopropenyl groups (hereinafter, simply referred to as "polymerizable monomer (a1)") and/or at least one ethylene-based unsaturated polymerizable monomer (a2) having two or more (meth)acrylic group (hereinafter, simply referred to as "polymerizable monomer (a2)").

In the embodiment, the ethylene-based unsaturated polymerizable monomer having two or more (meth)acrylic group is not included in the ethylene-based unsaturated polymerizable monomer having two or more vinyl groups or isopropenyl groups.

Examples of the polymerizable monomer (a1) include divinylbenzene, diisopropenylbenzene, trivinylbenzene, divinylnaphthalene, trivinylnaphthalene, divinylbiphenyl, trivinylbiphenyl, divinyldimethylbenzene, and trivinyldiethylnaphthalene, and the like. These can be used alone or in combination of two or more kinds thereof.

In the embodiment, the polymerizable monomer (a1) is preferably at least one selected from divinylbenzene, diisopropenylbenzene, trivinylbenzene, and divinylnaphthalene. Here, divinylbenzene is selected m-divinylbenzene or p-divinylbenzene, and may be a mixture of m-divinylbenzene and p-divinylbenzene. In addition, divinylbenzene may include ethylvinylbenzene.

Examples of the polymerizable monomer (a2) include polyfunctional (meth)acrylic acid esters such as glycerin di(meth)acrylate and trimethylolpropane tri(meth)acrylate, pentaerythritol tri(meth)acrylate, and the compound represented by the following general formula (1).

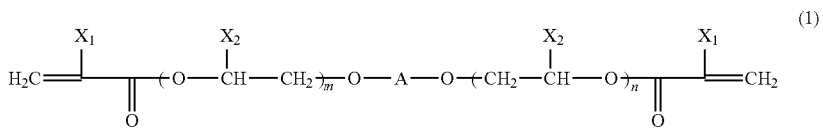

(1)

DESCRIPTION OF EMBODIMENTS

Hereinafter, the present invention will be described with reference to embodiments.

The process for producing photochromic optical materials of the embodiment has the following Steps (i) to (iii).

Step (i): a prepolymer is obtained by reacting at least one polymerizable monomer (A) having two or more ethylene-based unsaturated groups (hereinafter, simply referred to as "polymerizable monomer (A)") with at least one polythiol (B) having two or more mercapto groups (hereinafter, simply referred to as "polythiol (B)").

Step (ii): a polymerizable composition is obtained by mixing the prepolymer obtained in Step (i) and the photochromic compound (C).

Step (iii): the polymerizable composition obtained in Step (ii) is polymerized.

<Step (i)>

In Step (i), a prepolymer is obtained by reacting the polymerizable monomer (A) with the polythiol (B).

Moreover, in Step (i), the reaction between the polymerizable monomer (A) and the polythiol (B) is preferably prioritized over the reaction between the polymerizable monomers (A) from the viewpoint of exhibiting photochromic performance of the obtained molded product.

In formula (1), each of m and n is 0 or greater number, and m and n satisfy m+n=0 to 50. m and n preferably satisfy m+n=2 to 30, and more preferably satisfy m+n=2 to 4.

X$^1$ is a hydrogen atom or a methyl group, and a plurality of X$^1$ may be the same as or different from each other. X$^2$ is a hydrogen atom or an alkyl group having 1 or 2 carbon atoms, and a plurality of X$^2$ may be the same as or different from each other.

A is selected from a linear or branched alkylene group having 1 to 10 carbon atoms, a cyclic alkylene group, a phenylene group, an alkyl-substituted phenylene group having 1 to 9 carbon atoms, or the group represented by the following general formula (2) or (3).

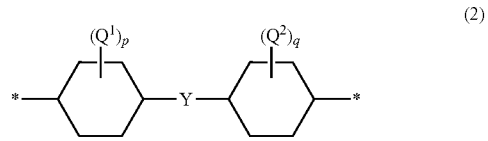

(2)

In formula (2), each of Q$^1$ and Q$^2$ is an alkyl group having a 1 to 4 carbon atoms, chlorine, or bromine. A plurality of Q$^1$ may be the same as or different from each other, and a plurality of $Q^2$ may be the same as or different from each other. Each of p and q is an integer of 0 to 4. Y is an oxygen atom, a sulfur atom, —$CH_2$—, or —$C(CH_3)_2$—. "*" represents a bonding hand.

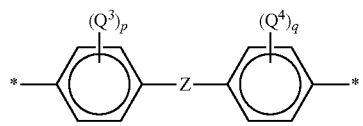

In formula (3), each of $Q^3$ and $Q^4$ is an alkyl group having a 1 to 4 carbon atoms, chlorine, or bromine. A plurality of $Q^3$ may be the same as or different from each other, and a plurality of $Q^4$ may be the same as or different from each other. Each of p and q is an integer of 0 to 4. Z is an oxygen atom, a sulfur atom, —$S(O_2)$—, —$C(O)$—, —$CH_2$—, —CH=CH—, —$C(CH_3)_2$—, or —$C(CH_3)$ $(C_6H_5)$—. "*" represents a bonding hand.

Examples of the compound represented by general formula (1) include polyethylene glycol di(meth)acrylate, ethoxylated bisphenol A di(meth)acrylate, 1,10-decanediol diacrylate, 1,6-hexanediol di(meth)acrylate, and 1,9-nonanediol di(meth)acrylate, and the like.

As the polymerizable monomer (a2), at least one selected from compounds represented by the following general formula (4) can be preferably used.

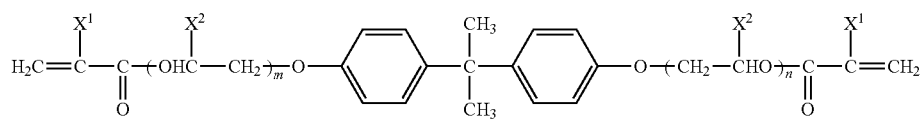

Each of $X^1$, $X^2$, m, and n in formula (4) has the same meaning as that in general formula (1). Examples of the polymerizable monomer represented by general formula (4) include 2,2'-bis(4-(methacryloyloxyethoxy)phenyl)propane, and the like.

As the polymerizable monomer (A), the polymerizable monomer (a1) and the polymerizable monomer (a2) are preferably used in combination with each other from the viewpoint of operability and a refractive index, and in this case, the weight ratio between the polymerizable monomer (a1) and the polymerizable monomer (a2) is 1:1, preferably 0.9:1, and particularly preferably 0.7:1.

In the embodiment, it is possible to use an ethylene-based unsaturated polymerizable monomer (D) having one (meth)acrylic group (hereinafter, referred to as "polymerizable monomer (D)") together with the polymerizable monomer (A).

Examples of the polymerizable monomer (D) can include monofunctional (meth)acrylic acid esters such as methyl (meth)acrylate, ethyl (meth)acrylate, n-butyl (meth)acrylate, ethylhexyl (meth)acrylate, cyclohexyl (meth)acrylate, 2-hydroxyethyl (meth)acrylate, glycidyl (meth)acrylate, isobornyl (meth)acrylate, and adamantyl (meth)acrylate; naphthyl (meth)acrylates such as α-naphthyl (meth)acrylate and β-naphthyl (meth)acrylate; aromatic (meth)acrylic acid esters such as phenoxyethyl (meth)acrylate; and the compound represented by the following general formula (5).

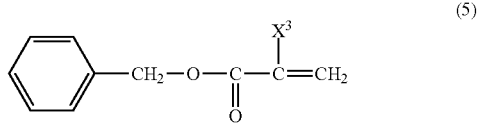

In general formula (5), $X^3$ is a hydrogen atom or a methyl group.

In the embodiment, as the polymerizable monomer (D), at least one selected from compounds represented by the following general formula (5) can be preferably used, and specific examples thereof include benzyl methacrylate and benzyl acrylate.

In the case of including the polymerizable monomer (D), the polymerizable monomer (D) is equal to or greater than 1% by weight, and preferably equal to or greater than 3% by weight, and the upper limit is equal to or less than 20% by weight, and preferably equal to or less than 15% by weight, with respect to the total weight of the polymerizable monomer (A), the polymerizable monomer (D), and the polythiol (B) described below. The upper limit and the lower limit can be suitably combined.

When the amount of the polymerizable monomer (D) is within the above range, it is possible to obtain a molded product which is excellent in optical properties or strength of the molded product, and light adjusting performance.

The polymerizable monomer (D) can be added in any step of Step (i) and Step (ii).

[Polythiol (B)]

The polythiol (B) is not particularly limited as long as it is a compound having two or more mercapto groups. Examples of the polythiol compound include a polythiol compound having a hydroxy group. These can be used in suitable combination.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), pentaerythritol tris(3-mercaptopropionate), pentaerythritol tris(thioglycolate), bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 1,2,3-tris(mercaptomethylthio) propane, 1,2,3-tris(2-mercaptoethylthio) propane, 1,2,3-tris (3-mercaptopropylthio) propane,4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-dimercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and esters of these thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis(mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane; aromatic polythiol compounds such as 1,2-dimercaptobenzene, 1,3-dimercaptobenzene, 1,4-dimercaptobenzene, 1,2-bis(mercaptomethyl) benzene, 1,3-bis(mercaptomethyl) benzene, 1,4-bis(mercaptomethyl) benzene, 1,2-bis(mercaptoethyl) benzene, 1,3-bis(mercaptoethyl) benzene, 1,4-bis(mercaptoethyl) benzene, 1,3,5-trimercaptobenzene, 1,3,5-tris(mercaptomethyl) benzene, 1,3,5-tris(mercaptomethyleneoxy) benzene, 1,3,5-tris(mercaptoethyleneoxy) benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophene dithiol, bismuthiol, 4,6-bis(mercaptomethylthio)-1,3-dithiane, and 2-(2,2-bis(mercaptomethylthio)ethyl)-1,3-dithietane; and the compounds represented by the following general formula (6), and the present invention is not limited to the exemplified compounds.

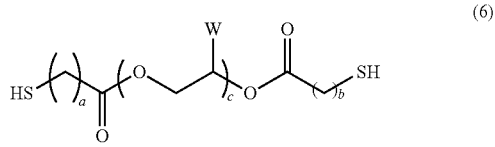

(6)

In the formula, each of a and b independently represents an integer of 1 to 4, and c represents an integer of 1 to 3. W is a hydrogen atom or a methyl group, and in a case where a plurality of W are present, W's may be the same as or different from each other.

Examples of the polythiol compound having a hydroxy group can include glycerine bis(mercaptoacetate) and 2,3-dimercapto-1-propanol, and the present invention is not limited to the exemplified compounds.

Furthermore, oligomers of these active hydrogen compounds or halogen substitutes such as a chlorine substitute and a bromine substitute may be used. These active hydrogen compounds can be used alone or in combination of two or more types thereof.

As the polythiol (B), pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-bis(mercaptomethyl)-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane are preferably used, and pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane are particularly preferably used.

[Catalyst]

In Step (i), a reaction is preferably performed in the presence of a catalyst.

Examples of such a catalyst include a radical polymerization initiator, amines, a quaternary ammonium salt, complexes of amines with borane and with boron trifluoride, and a phosphine-based compound, and at least two types thereof can also be used in combination.

The radical polymerization initiator may be any one which generates radicals by heat, ultraviolet rays, or an electron beam, and examples thereof include peroxides such as acetylcyclohexylsulfonyl peroxide, isobutyl peroxide, cumyl peroxy neodecanoate, diisopropyl peroxy dicarbonate, diallyl peroxy dicarbonate, di-n-propyl peroxy dicarbonate, dimyristyl peroxy dicarbonate, cumyl peroxy neohexanoate, di(2-ethoxyethyl)peroxy dicarbonate, di(methoxyisopropyl)peroxy dicarbonate, di(2-ethylhexyl) peroxy dicarbonate, tert-hexyl peroxy neodecanoate, di(3-methyl-3-methoxybutol)peroxy dicarbonate, tert-butyl peroxy neodecanoate, tert-hexyl peroxy neohexanoate, tert-butyl peroxy neohexanoate, 2,4-dichlorobenzoyl peroxide, tert-hexyl peroxy pivalate, tert-butyl peroxypivalate, 3,5,5-trimethyl hexanoyl peroxide, octanoyl peroxide, decanoyl peroxide, lauroyl peroxide, cumyl peroxy octoate, succinic acid peroxide, acetyl peroxide, tert-butyl peroxy(2-ethylhexanoate), m-toluoyl peroxide, benzoyl peroxide, tert-butyl peroxy isobutyrate, 1,1-bis(tetr-butylperoxy)-3,3,5-trimethyl cyclohexane, 1,1-bis(tetr-butylperoxy)cyclohexane, tert-butyl peroxy maleic acid, tert-butyl peroxyl laurate, tert-butyl peroxy-3,5,5-trimethyl hexanoate, cyclohexanone peroxide, tert-butyl peroxy allyl carbonate, tert-butyl peroxy isopropyl carbonate, 2,5-dimethyl-2,5-di(benzoylperoxy) hexane, 2,2-bis(tetr-butylperoxy)octane, tert-butyl peroxy acetate, 2,2-bis(tetr-butylperoxy)butane, tert-butyl peroxy benzoate, n-butyl-4,4-bis(tetr-butylperoxy)valerate, di-tetr-butyl peroxy isophthalate, methyl ethyl ketone peroxide, dicumyl peroxide, 2,5-dimethyl-2,5-di(tetr-butylperoxy) hexane, α,α'-bis(tetr-butyl peroxy-m-isopropyl)benzene, tert-butyl cumyl peroxide, di-tetr-butyl peroxide, and 2,5-dimethyl-2,5-di(tert-butylperoxy)3-hexyne; hydroperoxides such as diisopropylbenzene hydroperoxide, p-menthane hydroperoxide, 1,1,3,3-tetramethylbutyl hydroperoxide, 2,5-dimethylhexane-2,5-dihydroperoxide, cumene hydroperoxide, and tert-butyl hydroperoxide; known thermal polymerization catalysts including azo-based compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), azobiscyclohexane carbonitrile, 1-[(1-cyano-1-methylethyl)azo]formamide, and 2-phenylazo-4-methoxy-2,4-dimethylvaleronitrile, and dimethyl azobisisobutyrate, carbonyl compounds such as benzoin, benzoin monomethyl ether, benzoin isopropyl ether, acetoin, benzil, benzophenone, p-methoxybenzophenone, diethoxyacetophenone, 2-hydroxy-4-methoxy benzophenone, benzil dimethyl ketal, 2,2-diethoxy acetophenone, 1-hydroxycyclohexyl phenyl ketone, methylphenyl glyoxylate, ethylphenyl glyoxylate, and 2-hydroxy-2-methyl-1-phenylpropan-1-one, and sulfur compounds such as tetramethyl thiuram monosulfide and tetramethyl thiuram disulfide; and known photopolymerization catalysts including acylphosphine oxides such as 2,4,6-trimethylbenzoyl diphenyl phosphine oxide.

Examples of the amines include amine compounds represented by primary amines such as ethylamine, n-propylamine, sec-propylamine, n-butylamine, sec-butylamine, i-butylamine, t-butylamine, pentylamine, hexylamine, heptylamine, octylamine, decylamine, laurylamine, myristyl amine, 1, 2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethyl cyclohexane, aminobenzene, benzylamine, phenethylamine, α-phenylethylamine, naphthylamine, and furfurylamine; primary polyamines such as ethylenediamine, 1,2-diaminopropane, 1,3-diaminopropane, 1,2-diaminobutane, 1,3-diaminobutane, 1,4-diaminobutane, 1,5-aminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethyl ethanolamine, 1,2-, 1,3-, or 1,4-bis aminocyclohexane, 1,3- or 1,4-bisaminomethyl cyclohexane, 1,3- or 1,4-bis aminoethyl cyclohexane, 1,3- or 1,4-bisaminopropyl cyclohexane, hydrogenated 4,4'-diaminodiphenyl methane, 2- or 4-aminopiperidine, 2- or 4-aminomethyl piperidine, 2- or 4-aminoethyl piperidine, N-aminoethyl piperidine, N-aminopropyl piperidine, N-aminoethyl morpholine, N-aminopropyl morpholine, isophoronediamine, menthanediamine, 1,4-bisaminopropyl piperazine, o-, m-, or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenyl methane, 2,2-(4,4'-diaminodiphenyl)propane, 4,4'-diaminodiphenyl ether, 4,4'-thiodianiline, 4,4'-diaminodiphenyl sulfone, 4,4'-diaminoditolylsulfone, methylene bis(o-chloroaniline), 3,9-bis(3-aminopropyl) 2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethyl piperazine, N-aminopropyl piperazine, 1,4-bis(aminoethylpiperazine), 1,4-bis(aminopropylpiperazine), 2,6-diaminopyridine, and bis(3,4-diaminophenyl)sulfone; secondary amines such as diethylamine, dipropylamine, di-n-butylamine, di-sec-butylamine, diisobutylamine, di-n-pentylamine, di-3-pentylamine, dihexylamine, octylamine, di(2-ethylhexyl)amine, methylhexylamine, diallylamine, pyrrolidine, piperidine, 2-, 3-, 4-picoline, 2,4-, 2,6-, 3,5-lupetidine, diphenylamine, N-methylaniline, N-ethylaniline, dibenzylamine, methylbenzylamine, dinaphthylamine, pyrrole, indoline, indole, and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine; tertiary amine such as trimethylamine, triethylamine, tri-n-propylamine, tri-iso-propylamine, tri-1,2-dimethylpropylamine, tri-3-methoxypropylamine, tri-n-butylamine, tri-iso-butylamine, tri-sec-butylamine, tri-pentylamine, tri-3-pentylamine, tri-n-hexylamine, tri-n-octylamine, tri-2-ethylhexylamine, tri-dodecylamine, tri-laurylamine, tri-cyclohexylamine, N,N-dimethylhexylamine, N-methyldihexylamine, N,N-dimethylcyclohexylamine, N-methyldicyclohexylamine, triethanolamine, tribenzylamine, N,N-dimethylbenzylamine, diethylbenzylamine, triphenylamine, N,N-dimethylamino-p-cresol, N,N-dimethylaminomethyl phenol, 2-(N,N-dimethylaminomethyl)phenol, N,N-dimethylaniline, N,N-diethylaniline, pyridine, quinoline, N-methylmorpholine, N-methylpiperidine, and 2-(2-dimethylaminoethoxy)-4-methyl-1,3,2-dioxabornane; tertiary polyamines such as tetramethylethylenediamine, pyrazine, N,N'-dimethylpiperazine, N,N'-bis((2-hydroxy)propyl) piperazine, hexamethylenetetramine, N,N,N',N'-tetramethyl-1,3-butanamine, 2-dimethylamino-2-hydroxypropane, diethylaminoethanol, N,N,N-tris(3-dimethylaminopropyl)amine, 2,4,6-tris(N,N-dimethylaminomethyl)phenol, and heptamethyl isobiguanide; various imidazoles such as; imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenyl imidazole, 3,3-bis-(2-ethyl-4-methylimidazolyl) methane, an adduct of alkylimidazole and isocyanuric acid, and a condensate of alkylimidazole and formaldehyde; amidines such as 1,8-diazabicyclo(5,4,0)undecene-7 and 1,5-diazabicyclo(4,3,0)nonene-5,6-dibutylamino-1,8-diazabicyclo(5,4,0)undecene-7.

These may be used alone or in combination of two or more types thereof.

Examples of the quaternary ammonium salt include quaternary ammonium salts formed between the above-described amines and a halogen, a mineral acid, a Lewis acid, an organic acid, silicic acid, or tetrafluoroboric acid. These may be used alone or in combination of two or more types thereof.

Examples of the complex of amines with borane and with boron trifluoride include the above-described complexes of amines with borane and with boron trifluoride.

Examples of the phosphine-based compound can include trimethylphosphine, triethylphosphine, triisopropylphosphine, tri-n-propylphosphine, tri-tert-butylphosphine, tri-isobutylphosphine, tri-n-butylphosphine, tricyclohexylphosphine, triphenylphosphine, methyldiphenylphosphine, dimethylphenylphosphine, tri-o-tolylphosphine, tri-m-tolylphosphine, tri-p-tolylphosphine, dimethylphenylphosphine, diethylphenylphosphine, dichloro(ethyl)phosphine, dichloro (phenyl)phosphine, and chlorodiphenylphosphine. These may be used alone or in combination of two or more types thereof.

In Step (i), since the reaction between the polymerizable monomer (A) and the polythiol (B) is prioritized over the reaction between the polymerizable monomers (A) from the viewpoint of exhibiting photochromic performance of the obtained molded product, as a preferably catalyst, a phosphine-based compound is exemplified. In the embodiment, dimethylphenylphosphine or tributylphosphine is preferably used.

The amount used of the phosphine-based compound is within a range of 50 ppm to 1000 ppm, and preferably within a range of 100 ppm to 800 ppm, with respect to the total weight of the polymerizable monomer (A) and the polythiol (B).

[Other Components]

In Step (i), other components can be added as long as the components do not affect handling of the prepolymer.

Examples of the other components include ethylvinylbenzene; styrene, methylstyrene, dimethylstyrene, ethylstyrene, α-methylstyrene, chlorostyrene, dichlorostyrene, bromostyrene, and p-chloromethylstyrene; α-methylstyrene dimer; vinyl naphthalenes such as 1-vinylnaphthalene and 2-vinylnaphthalene; aromatic polymerizable monomers such as 4-vinylbiphenyl and vinylphenylsulfide; acrylonitrile, methacrylonitrile, maleic anhydride, and N-substituted maleimide; and allyl compounds such as diethylene glycol bisallyl carbonate and diallyl phthalate.

The above other components can be used alone or in combination of two or more types thereof.

Step (i) is a step of obtaining a prepolymer by reacting the polymerizable monomer (A) with the polythiol (B), the molar number before the reaction, that is, of the mercapto groups included in the polythiol (B) to be added is less than the molar number of the ethylene-based unsaturated groups included in the polymerizable monomer (A) to be added.

The molar number of the mercapto groups included in the polythiol (B) to be added is preferably equal to or less than 0.3 times, and more preferably equal to or less than 0.27 times with respect to the molar number of the entirety of the ethylene-based unsaturated groups included in the polymerizable monomer (A) to be added. The lower limit is equal to or greater than 0.05 times, and preferably equal to or greater than 0.08 times, from the viewpoint of the operability and the refractive index of the molded product obtained.

When the molar number is within the above range, it is possible to suppress the viscosity increase during the prepolymerization, and, since the dispersibilities of the photochromic compound (C) and the polymerization catalyst in Step (ii) are excellent, it is possible to obtain an optical material exhibiting desired photochromic performance. Furthermore, when the molar number is within the above range, it is possible to perform polymerization of the polymerizable composition in Step (iii) with favorable controllability, and it is possible to obtain an optical material with a high yield.

Although the reaction temperature in Step (i) is not particularly limited, the reaction is preferably performed at room temperature (equal to or lower than 30° C.)

The prepolymer obtained in Step (i) can have a viscosity of equal to or less than 1000 mPa·s at 20° C. When the viscosity is within the above range, handling of the prepolymer is easy, and there is no difficulty in working at room temperature, and thus, it is preferable.

As the end point of the prepolymer reaction, the amount of residual mercapto groups after the reaction may be measured and managed. The amount of residual mercapto groups can be measured by a general method, and examples thereof can include a titration by an iodine oxidation method and an analytical method using IR.

<Step (II)>

In Step (ii), a polymerizable composition is obtained by mixing the prepolymer obtained in Step (i) and the photochromic compound (C).

Specifically, it is possible to mix the prepolymer obtained in Step (i), the photochromic compound (C), and a polymerization catalyst.

[Photochromic Compound (C)]

In the embodiment, the photochromic compound (C) is not particularly limited, and an arbitrary one can be suitably selected from compounds known in the related art which can be used for photochromic lenses and used. For example, one or two or more types of a spiropyran-based compound, a spirooxazine-based compound, a fulgide-based compound, a naphthopyran-based compound, and a bisimidazole compound can be used depending on the desired color.

Examples of the spiropyran-based compound include compounds such as each substitute obtained by substituting the indole ring or the benzene ring of indolinospirobenzopyran with a halogen atom, a methyl group, an ethyl group, a methylene group, an ethylene group, or a hydroxyl group and the like; each substitute obtained by substituting the indole ring or the naphthalene ring of indolinospironaphthopyran with a halogen atom, a methyl group, an ethyl group, a methylene group, an ethylene group, or a hydroxyl group and the like; each substitute obtained by substituting the indole ring of indolinospiroquinolinopyran with a halogen atom, a methyl group, an ethyl group, a methylene group, an ethylene group, or a hydroxyl group and the like; and each substitute obtained by substituting the indole ring of indolinospiropyridopyran with a halogen atom, a methyl group, an ethyl group, a methylene group, an ethylene group, or a hydroxyl group and the like.

Examples of the spirooxazine-based compound include compounds such as each substitute obtained by substituting the indole ring or the benzene ring of indolinospirobenzoxazine with a halogen atom, a methyl group, an ethyl group, a methylene group, an ethylene group, or a hydroxyl group and the like; each substitute obtained by substituting the indole ring or the naphthalene ring of indolinospironaphthoxazine with a halogen atom, a methyl group, an ethyl group, a methylene group, an ethylene group, or a hydroxyl group and the like; each substitute obtained by substituting the indole ring of indolinospirophenanthroxazine with a halogen atom, a methyl group, an ethyl group, a methylene group, an ethylene group, or a hydroxyl group and the like; each substitute obtained by substituting the indole ring of indolinospiroquinolinoxazine with a halogen atom, a methyl group, an ethyl group, a methylene group, an ethylene group, or a hydroxyl group and the like; and each substitute obtained by substituting the piperidine ring and the naphthalene ring of indolinospironaphthoxazine with a halogen atom, a methyl group, an ethyl group, a methylene group, an ethylene group, or a hydroxyl group and the like.

Examples of the fulgide-based compound include N-cyanomethyl-6,7-dihydro-4-methyl-2-phenylspiro(5,6-benzo[b]thiophenedicarboximide-7,2'-tricyclo[$3.3.1.1^{3,7}$]decane], N-cyanomethyl-6,7-dihydro-2-(p-methoxyphenyl)-4-methylspiro(5,6-benzo[b]thiophene-dicarboximide-7,2'-tricyclo[$3.3.1.1^{3,7}$]decane), 6,7-dihydro-N-methoxycarbonylmethyl-4-methyl-2-phenylspiro(5,6-benzo[b]thiophene-dicarboximide-7,2'-tricyclo[$3.3.1.1^{3,7}$]decane), 6,7-dihydro-4-methyl-2-(p-methylphenyl)-N-nitromethylspiro(5,6-benzo[b]thiophenedicarboximide-7,2'-tricyclo[$3.3.1.1^{3,7}$]

decane), N-cyanomethyl-6,7-dihydro-4-cyclopropyl-3-methylspiro(5,6-benzo[b]thiophenedicarboximide-7,2'-tricyclo[3.3.1.1$^{3,7}$]decane), N-cyanomethyl-6,7-dihydro-4-cyclopropylspiro(5,6-benzo[b]thiophenedicarboximide-7,2'-tricyclo[3.3.1.1$^{3,7}$]decane), and N-cyanomethyl-6,7-dihydro-2-(p-methoxyphenyl)-4-cyclopropylspiro (5,6-benzo[b]thiophenedicarboximide-7,2'-tricyclo[3.3.1.1$^{3,7}$]decane) and the like.

Examples of the naphthopyran-based compound include spiro[norbornane-2,2'-[2H]benzo[h]chromene], spiro[bicyclo[3.3.1]nonane-9,2'-[2H]benzo[h]chromene], 7'-methoxyspiro[bicyclo[3.3.1]nonane-9,2'-[2H]benzo[h]chromene], 7'-methoxyspiro[norbornane-2,2'-[2H]benzo[f]chromene], 2,2-dimethyl-7-octoxy[2H]benzo[h]chromene, spiro[2-bicyclo[3.3.1]nonene-9,2'-[2H]benzo[h]chromene], spiro[2-bicyclo[3.3.1]nonene-9,2'-[2H]benzo[f]chromene], 6-morpholino-3,3-bis(3-fluoro-4-methoxyphenyl)-3H-benzo(f)chromene, 5-isopropyl-2,2-diphenyl-2H-benzo(h)chromene, the compound represented by the following general formula (7), and the compound represented by the following general formula (8) and the like.

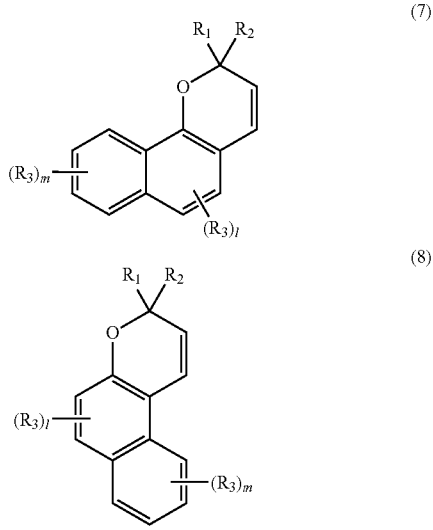

In general formulas (7) and (8), $R_1$ and $R_2$ may be the same as or different from each other, and each of $R_1$ and $R_2$ independently represents a hydrogen atom;
a linear or branched alkyl group having 1 to 12 carbon atoms;
a cycloalkyl group having 3 to 12 carbon atoms;
a substituted or unsubstituted aryl group having 6 to 24 carbon atoms or a substituted or unsubstituted heteroaryl group having 4 to 24 carbon atoms; or
an aralkyl or heteroaralkyl group (a linear or branched alkyl group having 1 to 4 carbon atoms is substituted with an aryl group or a heteroaryl group).

The substituent of a substituted aryl group having 6 to 24 carbon atoms or a substituted heteroaryl group having 4 to 24 carbon atoms is at least one selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an —NH$_2$ group, an —NHR group, or a —N(R)$_2$ group (R is a linear or branched alkyl group having 1 to 6 carbon atoms. In a case where two Rs are present, the two Rs may be the same as or different from each other), and a methacryloyl group or an acryloyl group.

$R_3$s may be the same as or different from each other, and each $R_3$s independently represents a halogen atom;
a linear or branched alkyl group having 1 to 12 carbon atoms;
a cycloalkyl group having 3 to 12 carbon atoms;
a linear or branched alkoxy group having 1 to 12 carbon atoms;
a linear or branched haloalkyl group having 1 to 12 carbon atoms which is substituted with at least one halogen atom, a linear or branched halocycloalkyl group having 3 to 12 carbon atoms which is substituted with at least one halogen atom, a linear or branched haloalkoxy group having 1 to 12 carbon atoms which is substituted with at least one halogen atom;
an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group as a substituent);
an aralkyl or heteroaralkyl group (a linear or branched alkyl group having 1 to 4 carbon atoms is substituted with the aryl group or the heteroaryl group);
a substituted or unsubstituted phenoxy or naphthoxy group (which has at least one substituent selected from a linear or branched alkyl group or alkoxy group having 1 to 6 carbon atoms as a substituent);
—NH$_2$, —NHR, —CONH$_2$, or —CONHR (R is a linear or branched alkyl group having 1 to 6 carbon atoms); or
—OCOR$_8$ or —COOR$_8$ (here, R$_8$ is a linear or branched alkyl group having 1 to 6 carbon atoms, a cycloalkyl group having 3 to 6 carbon atoms, or in $R_1$ and $R_2$, a phenyl group which is substituted with at least one substituent of a substituted aryl group or a substituted heteroaryl group or an unsubstituted phenyl group).

It is possible to form one or more aromatic ring groups or non-aromatic ring groups by bonding of at least two adjacent $R_3$s to each other and by including the carbon atom to which $R_3$ is bonded. The aromatic ring group or non-aromatic ring group includes one ring or two annelated rings which may include a heteroatom selected from the group consisting of oxygen, sulfur, and nitrogen.

l is an integer of 0 to 2. m is an integer of 0 to 4.

In addition, examples of the naphthopyran-based compound include compounds described in WO2013/78086, WO2012/149599, WO2010/020770, and WO2009/146509, and a compound having two or more naphthopyran rings in one molecule by bonding of structures represented by general formula (7) or (8) by a linking group.

Preferable examples of the naphthopyran-based compound represented by general formula (7) include the compound represented by the following general formula (9) (hereinafter, also referred to as the compound (9)).

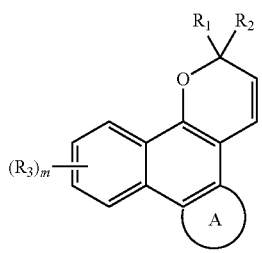

(9)

Each of $R_1$, $R_2$, $R_3$, and m has the same meaning as that described above, and A represents annelated rings represented by the following formulas ($A_1$) to ($A_5$).

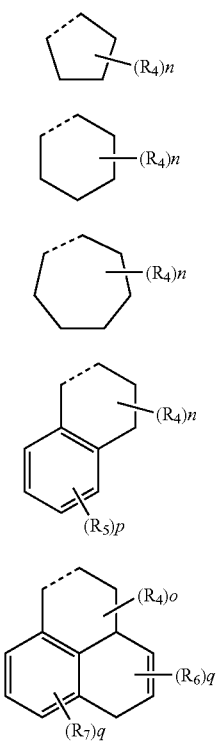

($A_1$)

($A_2$)

($A_3$)

($A_4$)

($A_5$)

In these annelated rings ($A_1$) to ($A_5$), a dotted line represents a $C_5$-$C_6$ bond of the naphthopyran ring in general formula (9). The a bond of the annelated ring ($A_4$) or ($A_5$) is bonded to the $C_5$ or $C_6$ of the naphthopyran ring in general formula (9).

$R_4$'s may be the same as or different from each other, and each $R_4$'s independently represents OH or an linear or branched alkyl group or alkoxy group having 1 to 6 carbon atoms, or two $R_4$'s form a carbonyl group (CO).

Each of $R_5$, $R_6$, and $R_7$ independently represents a halogen atom (preferably, a fluorine atom, a chlorine atom, or a bromine atom); a linear or branched alkyl group having 1 to 12 carbon atoms (preferably, a linear or branched alkyl group having 1 to 6 carbon atoms);

a linear or branched haloalkyl group having 1 to 6 carbon atoms which is substituted with at least one halogen atom (preferably, a fluoroalkyl group);
a cycloalkyl group having 3 to 12 carbon atoms;
a linear or branched alkoxy group having 1 to 6 carbon atoms;
a substituted or unsubstituted phenyl or benzyl group (which has at least one of substituents described above in the definition of $R_1$ and $R_2$ groups as a substituent in a case where each of $R_1$ and $R_2$ groups in general formula (9) independently corresponds to an aryl or heteroaryl group);
—$NH_2$ or —NHR (here, R is a linear or branched alkyl group having 1 to 6 carbon atoms);
a substituted or unsubstituted phenoxy or naphthoxy group (which has at least a linear or branched alkyl group or alkoxy group having 1 to 6 carbon atoms as a substituent); or
a —$COR_9$, —$COOR_9$, or —$CONHR_9$ group (here, $R_9$ represents a linear or branched alkyl group having 1 to 6 carbon atoms, a cycloalkyl group having 3 to 6 carbon atoms, or a substituted or unsubstituted phenyl or benzyl group (which has at least one of substituents described above in the definition of $R_1$ and $R_2$ groups as a substituent in a case where each of $R_1$ and $R_2$ groups in general formula (9) independently corresponds to an aryl or heteroaryl group)).

n is an integer 0 to 6, o is an integer 0 to 2, p is an integer 0 to 4, and q is an integer 0 to 3.

In a case where A represents ($A_4$), n is an integer of 0 to 2, p is an integer of 0 to 4, and in a case where A represents ($A_2$), n is an integer of 0 to 2.

The photochromic compound (C) of general formula (9) has high coloring adaptability even at 40° C. by being combined with the discoloration reaction rate that is applied to the use being required. The colors capable of being easily achieved are colors from orange to blue.

In the embodiment, a mixture of the compound (9) belonging to at least one different type selected from the group consisting of the compound (9) in which A is ($A_1$), the compound (9) in which A is ($A_2$), the compound (9) in which A is ($A_3$), the compound (9) in which A is ($A_4$), and the compound (9) in which A is ($A_5$) also is included.

In the embodiment, as the compound (9), the compound represented by the following general formula (10) can be preferably used.

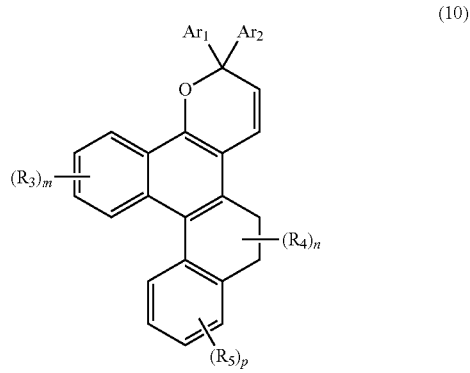

(10)

$Ar_1$ and $Ar_2$ are aromatic groups, and these may be the same as or different from each other, and each of $Ar_1$ and $Ar_2$ represents a benzene ring or a thiophene ring which may be substituted. As the substituent of the benzene ring or the thiophene ring, a linear or branched alkyl group having 1 to 10 carbon atoms, a linear or branched alkoxy group having 1 to 10 carbon atoms, or a linear or branched alkyl mono (or di) substituted amino group having 1 to 6 carbon atoms can be exemplified. Each of $R_3$, $R_4$, $R_5$, m, n, and p has the same meaning as that described above.

As the compound (9), the compound represented by the following general formula (11) can be further preferably used.

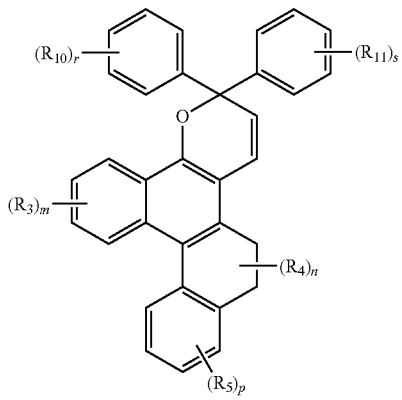

(11)

In formula (11), $R_{10}$ and $R_{11}$ may be the same as or different from each other, and each of $R_{10}$ and $R_{11}$ represents a linear or branched alkyl group having 1 to 10 carbon atoms, a linear or branched alkoxy group having 1 to 10 carbon atoms, or a linear or branched alkyl mono (or di) substituted amino group having 1 to 6 carbon atoms. When m is 2, it is possible to form a ring structure by bonding of adjacent $R_3$s to each other and by including the carbon atom to which $R_3$ is bonded. r and s are integers of 0 to 4. The above ring structure is a structure of a substituted or unsubstituted aryl group having 6 to 24 carbon atoms or a substituted or unsubstituted heteroaryl group having 3 to 24 carbon atoms.

Each of $R_3$, $R_4$, $R_5$, m, n, and p has the same meaning as that described above.

As specific examples of the compound represented by general formula (11), the compound represented by the following formula (12) or (13) can be exemplified. In the embodiment, the compound represented by the following formula (12) or (13) is preferable. The compound represented by formula (12) is particularly preferable.

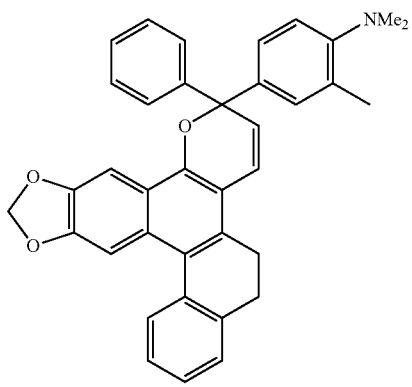

(12)

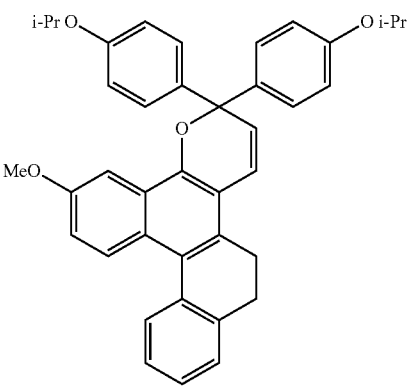

(13)

The compound represented by general formula (9) which is the photochromic compound (C) can be synthesized by a known method. For example, the compound can also be synthesized by the method described in Japanese Unexamined Patent Publication No. 2004-500319.

In addition, as specific examples of the naphthopyran-based compound represented by general formula (7), the compound represented by the following formula (14) can be preferably exemplified.

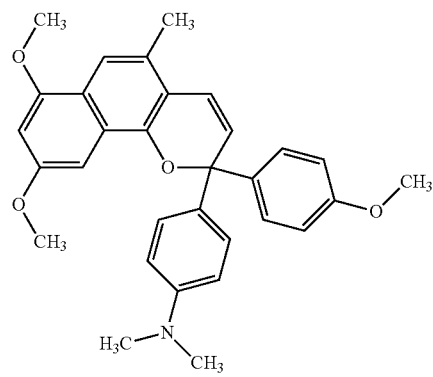

(14)

As the naphthopyran-based compound, one or more compounds selected from the above-described compounds may be used.

[Polymerization Catalyst]

As the polymerization catalyst used in Step (ii), the catalysts described in Step (i) can be used, and these catalysts may be the same as or different from each other.

A catalyst which is less likely to affect the photochromic compound used and can promote the reaction between the polymerizable monomers (A) is preferable. Examples of such a polymerization catalyst include the azo-based compound described above.

In the embodiment, as the azo-based compound, 2,2'-azobis(2,4-dimethylvaleronitrile) is preferably used.

In Step (ii), when a prepolymer and a photochromic compound are mixed, the photochromic compound may be mixed with the prepolymer, or after the photochromic compound is mixed with a solvent which does not affect the reaction, the mixed liquid may be mixed with the prepolymer. Moreover, an azo compound is also mixed in the same manner. As the solvent, general solvents can be used, and examples thereof can include toluene and divinyl benzene which is the polymerizable monomer (a1).

Although the mixing temperature in Step (ii) is not particularly limited, the reaction is preferably performed at room temperature (equal to or lower than 30° C.).

In the embodiment, an additive such as a light stabilizer, an ultraviolet absorbent, an antioxidant, a coloration inhibitor, a dye, or a resin modifier can be included depending on the purpose. Regarding an adding method of an additive, since preparation orders vary depending on the component used (the polymerizable monomer (A), the polythiol (B), or the photochromic compound (C)), and the type and the amount used of the additive, the method cannot be generally limited, and is suitably selected in consideration of the solubility, operability, safety, convenience, and the like of the additive. These additives can be added in Step (i) or Step (ii), and can be added in any of Step (i) and Step (ii).

<Step (iii)>

In Step (iii), the polymerizable composition obtained in Step (ii) is polymerized. Specifically, the polymerizable composition can be polymerized in the presence of a polymerization catalyst, preferably, in the presence of an azo-based compound. Thereby, it is possible to obtain a photochromic optical material.

Examples of the photochromic optical material can include a photochromic lens, and specifically, the photochromic lens can be obtained in the following manner.

The polymerizable composition obtained in the embodiment is injected into a mold held using a gasket, tape, or the like. At this time, a degassing treatment, a filtration treatment such as pressurization or depressurization, and the like under reduced pressure are preferably performed, as necessary, depending on properties that the obtained molded product requires.

Since the polymerization conditions of the polymerizable composition significantly vary depending on the types of the component used, the shape of the mold, and the like, the polymerization conditions are not limited; however, polymerization is performed at a temperature of about 0° C. to 140° C. over a period of 1 hour to 48 hours.

The molded product obtained in the above manner may be subjected to a treatment such as annealing, as necessary. The treatment is performed typically at a temperature within a range of 50° C. to 150° C., and preferably performed at a temperature within a range of 90° C. to 140° C., and more preferably performed at a temperature within a range of 100° C. to 130° C.

<Uses>

A molded product formed of the photochromic polymerizable composition of the embodiment can be obtained in various shapes by changing molds during cast polymerization. Since the resin molded product has photochromic performance, a high refractive index, and high transparency, the molded product can be used in various optical materials such as a plastic lens. In particular, the molded product is suitable as optical materials such as a plastic spectacle lens, and optical elements.

The plastic lenses of the embodiment may be provided with a coating layer on a single surface or both surfaces thereof as necessary, and then used. Examples of the coating layer include a primer layer, a hard coating layer, an antireflection film layer, an antifog coated film layer, an antifouling layer, a water-repellent layer and the like. These coating layers may respectively be used alone, or may be used after multilayering the plurality of coating layers. In a case where the coating layers are provided on both surfaces, similar coating layers may be provided on the respective surfaces, or different coating layers may be provided.

In the coating layers, an ultraviolet absorbent for the purpose of protecting lenses or eyes from ultraviolet rays, infrared absorbent for the purpose of protecting eyes from infrared rays, a light stabilizer or an antioxidant for the purpose of improving weather resistance of lenses, a stain or pigment, furthermore, a photochromic stain or photochromic pigment for the purpose of improving fashionability of lenses, an antistatic agent and other well-known additives for enhancing performances of lenses may respectively be jointly used. For layers coated by coating, a variety of leveling agents may be used for the purpose of improving coatability.

The primer layer is generally formed between the hard coating layer described below and an optical lens. The primer layer is a coating layer having an object of improving adhesion between the hard coating layer formed on the primer layer and the lens, and, depending on cases, it is also possible to improve impact resistance. Although any material can be used for the primer layer as long as it has high adhesion to an obtained optical lens, in general, a primer composition mainly including a urethane-based resin, an epoxy-based resin, a polyester-based resin, a melanin-based resin, polyvinyl acetal, or the like is used. For the primer composition, a suitable solvent having no influence on lenses may be used for the purpose of adjusting a viscosity of the composition. It is needless to say that the primer composition may be used without a solvent.

The primer composition can be formed using any one of a coating method and a dry method. In a case in which the coating method is used, the primer layer is formed by applying the composition on a lens using a well-known coating method, such as spin coating or dip coating, and then solidifying the composition. In a case where the dry method is performed, the primer layer is formed by a well-known dry method such as a CVD method or a vacuum deposition method. When the primer layer is formed, a pretreatment such as an alkali treatment, a plasma treatment, or an ultraviolet treatment may be performed on surfaces of a lens as necessary for the purpose of improving adhesion.

The hard coating layer is a coating layer for the purpose of supplying functions of abrasion resistance, wear resistance, moisture resistance, warm water resistance, thermal resistance, weather resistance, and the like to the surfaces of a lens.

As the hard coating layer, a hard coating composition including one or more types of fine particles formed of a curable organic silicon compound and fine particles of one or more oxides of elements selected from an element group of Si, Al, Sn, Sb, Ta, Ce, La, Fe, Zn, W, Zr, In, and Ti and/or a composite oxide of two or more elements selected from the above element group is generally used.

The hard coating composition preferably includes at least any one of amines, amino acids, metal acetylacetonate complexes, organic acid metallic salts, perchloric acids, salts of perchloric acids, acids, metallic chlorides, and polyfunctional epoxy compounds, in addition to the above-described components. For the hard coating composition, a suitable solvent having no influence on lenses may be used. It is needless to say that the primer composition may be used without a solvent.

The hard coating layer is generally formed by coating with the hard coating composition by a well-known coating method such as a spin coating or a dip coating, and then curing the composition. Examples of a curing method include a curing method in which thermal curing or radiation of energy rays, such as ultraviolet rays or visible light rays, is used. A refractive index of the hard coating layer is preferably in a range of a difference of ±0.1 from the refractive index of the lens in order to suppress the occurrence of interference fringe.

The antireflection film layer is generally formed on the hard coating layer as necessary. There are inorganic antireflection film layers and organic antireflection film layers in the antireflection film layers, and the inorganic antireflection film layers are formed using an inorganic oxide such as $SiO_2$ or $TiO_2$ by a dry method such as a vacuum deposition method, a sputtering method, an ion plating method, an ion beam assisting method, or a CVD method. The organic antireflection film layers are formed using a composition including an organic silicon compound and silica-based fine particles having internal cavities by a wet method.

Single antireflection film layer or multiple antireflection film layers may be provided, and, in a case where single antireflection film layer is used, the refractive index of the antireflection film layer is preferably smaller than the refractive index of the hard coating layer by at least equal to or greater than 0.1. In order to effectively develop an antireflection function, it is preferable to form multiple antireflection films, and, in this case, films having a low refractive index and films having a high refractive index are alternately stacked. Even in this case, a difference in the refractive index between the films having a low refractive index and the films having a high refractive index is preferably equal to or greater than 0.1. Examples of the film having a high refractive index include films of ZnO, $TiO_2$, $CeO_2$, $Sb_2O_5$, $SnO_2$, $ZrO_2$, $Ta_2O_5$, and the like, and examples of the film having a low refractive index include films of $SiO_2$ and the like.

The antifog coated film layer, the antifouling layer and the water-repellent layer are formed on the antireflection film layer as necessary. Regarding methods for forming an antifog coated layer, an antifouling layer, and a water-repellent layer, treatment methods, treatment materials, and the like are not particularly limited as long as no adverse influences are brought to the antireflection function, and well-known antifog coating treatment methods, antifouling treatment methods, water-repellency-providing treatment methods, and materials can be used. Examples of the antifog coating and antifouling treatment methods include a method in which the surface is covered with a surfactant, a method in which a hydrophilic film is added to the surface so as to provide water absorbability, a method in which the surface is coated with fine irregularity so as to enhance water absorbability, a method in which a photocatalytic activity is used so as to provide water absorbability, and a method in which a super water-repellency-providing treatment is carried out so as to prevent attachment of water droplets. In addition, examples of the water-repellency-providing treatment method include a method in which a water-repellency-provided layer is formed using a fluorine-containing silane compound or the like and deposition or sputtering, a method in which a fluorine-containing silane compound is dissolved in a solvent and then coated so as to form a water-repellency-provided layer, and the like.

The embodiments of the present invention have been described above. However, the embodiments are only examples of the present invention and various configurations other than that described above may also be employed within a range which does not impair the effects of the invention.

EXAMPLES

Hereinafter, the present invention will be described in more detail based on Examples, but the invention is not intended to be limited to these.

The lens obtained by polymerization was evaluated by performing a performance test. In the performance test, a refractive index, an Abbe number, a specific gravity, and photochromic performance were measured by the following test method.

Refractive index (ne) and Abbe number (ve): measurement was performed at 20° C. using a Pulfrich refractometer KPR-30 manufactured by Shimadzu Corporation.

Specific gravity: measurement was performed at 20° C. using an Archimedes method.

Photochromic performance 1 (evaluation of color forming performance): a molded product having a thickness of 2.0 mm was produced, then, the molded product was irradiated with ultraviolet rays having a wavelength of 365 nm for 10 minutes from a position of a height of 155 mm using a handy UV lamp SLUV-6 manufactured by AS ONE Corporation, and the color of the molded product after ultraviolet ray irradiation was measured as an L* value, an a* value, and a b* value using a colorimeter (CR-200, manufactured by Konica Minolta, Inc.). The amount of change in the color was calculated by the following equation based on L* values, a* values, and b* values before and after ultraviolet ray irradiation.

$$\Delta E^*ab=[(\Delta L^*)^2+(\Delta a^*)^2+(\Delta b^*)^2]^{1/2}$$

When a ΔE*ab value was equal to or greater than 20, it was evaluated as OO, when a ΔE*ab value was equal to or greater than 15 and less than 20, it was evaluated as O, and when a ΔE*ab value was less than 15, it was evaluated as X.

Photochromic performance 2 (evaluation of fading performance): a molded product having a thickness of 2.0 mm was produced, then, the molded product was irradiated with ultraviolet rays having a wavelength of 365 nm for 10 minutes from a position of a height of 155 mm using a handy UV lamp SLUV-6 manufactured by AS ONE Corporation, and the color of the molded product after being allowed to stand for 10 minutes in a dark place shielded was measured as a L* value, an a* value, and a b* value using a colorimeter (CR-200, manufactured by Konica Minolta, Inc.). The amount of change in the color was calculated by the following equation based on L* values, a* values, and b* values before ultraviolet ray irradiation and when allowed to stand for 10 minutes after ultraviolet ray irradiation.

$$\Delta E^*ab=[(\Delta L^*)^2+(\Delta a^*)^2+(\Delta b^*)^2]^{1/2}$$

When a ΔE*ab value was less than 5, it was evaluated as OO, when a ΔE*ab value was equal to or greater than 5 and less than 10, it was evaluated as O, and when a ΔE*ab value was equal to or greater than 10, it was evaluated as X.

In the following Examples, the following components were used.

Divinylbenzene (composition ratio: 96% of divinylbenzene, about 4% of ethyl vinyl benzene)

Example 1

36.32 g (0.067 mol) of EO-modified bisphenol A dimethacrylate (product name E-120, manufactured by Sartomer Co., Ltd.) was added to 20.44 g (0.116 mol) of benzyl methacrylate, and 25.44 g (0.188 mol) of divinylbenzene was added thereto, and the resultant product was mixed and dissolved at 20° C., whereby a homogeneous solution was obtained. To the homogeneous solution, 0.03 g of dimethylphenylphosphine which was a catalyst was added, and the resultant product was mixed and dissolved at 20° C. To the homogeneous solution, 12.80 g (0.035 mol) of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was further added, and the resultant product was mixed and dissolved at 20° C., whereby a homogeneous solution was obtained. The viscosity of the homogeneous solution at this time was 20 mPa·s. Prepolymerization was performed by stirring the homogeneous solution at 30° C. for 120 minutes in a warm bath. Prepolymerization was performed until a mercapto group was not detected in the prepolymer by analysis using IR. The viscosity of the homogeneous solution (prepolymerized solution) after the prepolymerization was 150 mPa·s (measured at 20° C.)

0.046 g of the compound represented by formula (12) as a photochromic compound and 0.20 g of 2,2'-azobis(2,4-dimethylvaleronitrile) were added to 5.00 g (0.037 mol) of divinylbenzene, and the resultant product was mixed and dissolved at 20° C. (hereinafter, referred to as "solution I").

To the prepolymerized solution, the total amount of solution I was added, and the resultant product was mixed and dissolved at 20° C., whereby a homogeneous solution was obtained. The homogeneous solution was degassed at 600 Pa for 30 minutes, then, filtered using a 1 μm PTFE filter, and injected into a mold formed of a glass mold and tape. The mold was put into an oven, and slowly heated from 25° C. to 100° C. over a period of 17 hours to polymerize the solution. After completion of the polymerization, the mold was taken out from the oven, and the product was released from the mold, whereby a molded product having a thickness of 2.0 mm was obtained. The obtained molded product was further subjected to an annealing treatment at 110° C. for 1 hour. The refractive index (ne), the Abbe number (ve), and the resin specific gravity of the obtained molded product were 1.600, 32, and 1.18, respectively. In the photochromic performance, the color forming performance and the fading performance were evaluated as OO, respectively. The results are shown in Table-1.

Example 2

The same operation as in Example 1 was performed except that 0.07 g of tributylphosphine was used instead of dimethylphenylphosphine, as a catalyst. The viscosity after the prepolymerization was 150 mPa·s (measured at 20° C.). Polymerization was performed in the same manner as in Example 1, whereby a molded product having a thickness of 2.0 mm was obtained. The refractive index (ne), the Abbe number (ve), and the specific gravity of the obtained molded product were 1.599, 32, and 1.17, respectively. In the photochromic performance, the color forming performance and the fading performance were evaluated as OO, respectively. The results are shown in Table-1.

Example 3

The same operation as in Example 1 was performed except that 0.07 g of tributylphosphine was used instead of dimethylphenylphosphine, as a catalyst, and 0.046 g of the compound represented by formula (14) was used as a photochromic compound. The viscosity after the prepolymerization was 150 mPa·s (measured at 20° C.). Polymerization was performed in the same manner as in Example-1, whereby a molded product having a thickness of 2.0 mm was obtained. The refractive index (ne), the Abbe number (ve), and the specific gravity of the obtained molded product were 1.599, 32, and 1.17, respectively. In the photochromic performance, the color forming performance and the fading performance were evaluated as OO, respectively. The results are shown in Table-1.

Example 4

25.00 g (0.046 mol) of EO-modified bisphenol A dimethacrylate (product name E-120, manufactured by Sartomer Co., Ltd.) was added to 25.00 g (0.142 mol) of benzyl methacrylate, and 40.00 g (0.296 mol) of divinylbenzene was added thereto, and the resultant product was mixed and dissolved at 20° C., whereby a homogeneous solution was obtained. To the homogeneous solution, 0.03 g of dimethylphenylphosphine which was a catalyst was added, and the resultant product was mixed and dissolved at 20° C. To the homogeneous solution, 5.00 g (0.014 mol) of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was further added, and the resultant product was mixed and dissolved at 20° C., whereby a homogeneous solution was obtained. The viscosity of the homogeneous solution at this time was 20 mPa·s. Prepolymerization was performed by stirring the homogeneous solution at 30° C. for 120 minutes in a warm bath. Prepolymerization was performed until a mercapto group was not detected in the prepolymer by analysis using IR. The viscosity of the homogeneous solution (prepolymerized solution) after the prepolymerization was 85 mPa·s (measured at 20° C.)

0.046 g of the compound represented by formula (12) as a photochromic compound and 0.20 g of 2,2'-azobis(2,4-dimethylvaleronitrile) were added to 5.00 g (0.037 mol) of divinylbenzene, and the resultant product was mixed and dissolved at 20° C. (hereinafter, referred to as "solution I").

To the prepolymerized solution, the total amount of solution I was added, and the resultant product was mixed and dissolved at 20° C., whereby a homogeneous solution was obtained. The homogeneous solution was degassed at 600 Pa for 30 minutes, then, filtered using a 1 μm PTFE filter, and injected into a mold formed of a glass mold and tape. The mold was put into an oven, and slowly heated from 25° C. to 100° C. over a period of 17 hours to polymerize the solution. After completion of the polymerization, the mold was taken out from the oven, and the product was released from the mold, whereby a molded product having a thickness of 2.0 mm was obtained. The obtained molded product was further subjected to an annealing treatment at 110° C. for 1 hour. The refractive index (ne), the Abbe number (ve), and the specific gravity of the obtained molded product were 1.600, 31, and 1.14, respectively. In the photochromic performance, the color forming performance and the fading performance were evaluated as OO, respectively. The results are shown in Table-1.

Comparative Example 1

36.32 g (0.067 mol) of EO-modified bisphenol A dimethacrylate (product name E-120, manufactured by Sartomer Co., Ltd.) was added to 20.44 g (0.116 mol) of benzyl methacrylate, and 25.44 g (0.188 mol) of divinylbenzene was added thereto, and the resultant product was mixed and dissolved at 20° C., whereby a homogeneous solution was obtained.

To the homogeneous solution, 12.80 g (0.035 mol) of a mixture of 5,7-dimercaptomethyl-1,11-dimercapto-3,6,9-trithiaundecane, 4,7-dimercaptomethyl-1,11-dimercapto-3, 6,9-trithiaundecane, and 4,8-dimercaptomethyl-1,11-dimercapto-3,6,9-trithiaundecane was further added, and the resultant product was mixed and dissolved at 20° C., whereby a homogeneous solution was obtained. The viscosity of the homogeneous solution at this time was 20 mPa·s. Prepolymerization of the homogeneous solution was not performed.

0.046 g of the compound represented by formula (12) as a photochromic compound and 0.20 g of 2,2'-azobis(2,4-dimethylvaleronitrile) were added to 5.00 g (0.037 mol) of divinylbenzene, and the resultant product was mixed and dissolved at 20° C. (hereinafter, referred to as "solution I").

Comparative Example 3

When the same operation as in Example 1 was performed except that 22.90 g (0.063 mol) of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was used as a polythiol compound, the resultant product became gelatinous at the time of prepolymerization, and due to this, in the next step, a photochromic compound could not be mixed therein, and thus, the reaction was stopped.

TABLE 1

| | Total molar number of ethylene-based unsaturated group | Molar number of mercapto group | Prepolymerization catalyst | Viscosity of prepolymerization solution [mPa · s] | Refractive index [ne] | Abbe number | Specific gravity | Photochromic performance 1 [evaluation of color forming performance] | Photochromic performance 2 [evaluation of fading performance] |
|---|---|---|---|---|---|---|---|---|---|
| Example 1 | 0.51 | 0.14 | DMPP | 150 | 1.600 | 32 | 1.18 | ○○ | ○○ |
| Example 2 | 0.51 | 0.14 | TBP | 150 | 1.599 | 32 | 1.17 | ○○ | ○○ |
| Example 3 | 0.51 | 0.14 | TBP | 150 | 1.599 | 32 | 1.17 | ○○ | ○○ |
| Example 4 | 0.684 | 0.056 | DMPP | 85 | 1.600 | 31 | 1.14 | ○○ | ○○ |
| Comparative Example 1 | 0.51 | 0.14 | None | Prepolymerization was not performed | 1.600 | 32 | 1.18 | X | X |
| Comparative Example 2 | 0.51 | 0.14 | DMPP | Prepolymerization was not performed | 1.600 | 32 | 1.18 | ○ | X |

DMPP: dimethylphenylphosphine
TBP: tributylphosphine

To the homogeneous solution, the total amount of solution I was added, and the resultant product was mixed and dissolved at 20° C., whereby a homogeneous solution was obtained. The homogeneous solution was degassed at 600 Pa for 30 minutes, then, filtered using a 1 μm PTFE filter, and injected into a mold formed of a glass mold and tape. The mold was put into an oven, and slowly heated from 25° C. to 100° C. over a period of 17 hours to polymerize the solution. After completion of the polymerization, the mold was taken out from the oven, and the product was released from the mold, whereby a molded product having a thickness of 2.0 mm was obtained. The obtained molded product was further subjected to an annealing treatment at 110° C. for 1 hour. The refractive index (ne), the Abbe number (ve), and the resin specific gravity of the obtained molded product were 1.600, 32, and 1.18, respectively. In the photochromic performance, the color forming performance and the fading performance were evaluated as X, respectively. The results are shown in Table-1.

Comparative Example 2

The same operation as in Example 1 was performed except that the prepolymerization at 30° C. for 120 minutes in a warm bath in Example 1 was not performed. Polymerization was performed in the same manner as in Example 1, whereby a molded product having a thickness of 2.0 mm was obtained. The refractive index (ne), the Abbe number (ve), and the resin specific gravity of the obtained molded product were 1.600, 32, and 1.18, respectively. For the photochromic performance, the color forming performance was evaluated as O; however, the fading performance was evaluated as X, respectively. The results are shown in Table-1.

In Examples 1, 2, and 3, prepolymerization step was performed under predetermined conditions, whereby an optical material which was excellent in photochromic performance, having a refractive index of about 1.60 was obtained. In Example 4, it was found that, even in a case where the amount of polythiol to be added was reduced, the optical material was excellent in photochromic performance and optical properties. On the other hand, in a case where the catalyst of Comparative Example 1 was not used, desired photochromic performance could not be obtained. In addition, in Comparative Example 2, it was found that, when prepolymerization was not performed even in a case where a catalyst was used, the photochromic performance of the obtained optical material was poor.

This application claims priority from Japanese Patent Application No. 2013-161742 filed on Aug. 2, 2013, the content of which is incorporated herein by reference in its entirety.

The invention also includes the following aspects.

[1] The process for producing photochromic optical materials, including a step (i) of reacting at least one polymerizable monomer (A) having two or more ethylene-based unsaturated groups with at least one polythiol (B) having two or more mercapto groups to obtain a prepolymer; a step (ii) of mixing the prepolymer and a photochromic compound (C) to obtain a polymerizable composition; and a step (iii) of polymerizing the polymerizable composition, in which, before the reaction of the step (i), the molar number of the mercapto groups included in the polythiol (B) is smaller than the molar number of the radical polymerizable ethylene-based unsaturated groups included in the polymerizable monomer (A).

[2] The process for producing photochromic optical materials according to [1], in which, before the reaction of the step (i), the molar number of the mercapto groups included in the polythiol (B) is equal to or less than 0.30 times the molar number of the entirety of ethylene-based unsaturated groups included in the polymerizable monomer (A).

[3] The process for producing photochromic optical materials according to [1] or [2], in which the polymerizable monomer (A) includes at least one ethylene-based unsaturated polymerizable monomer (a1) having two or more vinyl groups and/or at least one ethylene-based unsaturated polymerizable monomer (a2) having two or more (meth)acrylic groups.

[4] The process for producing photochromic optical materials according to any one of [1] to [3], in which, in the step (i), an ethylene-based unsaturated polymerizable monomer having one (meth)acrylic group is included.

[5] The process for producing photochromic optical materials according to any one of [1] to [4], in which, in the step (i), the polymerizable monomer (A) reacts with the polythiol (B) in the presence of a phosphine-based compound.

[6] The process for producing photochromic optical materials according to any one of [1] to [5], in which the step (ii) is a step of mixing the prepolymer, the photochromic compound (C), and an azo-based compound.

[7] The process for producing photochromic optical materials according to [6], in which the step (iii) is a step of polymerizing the polymerizable composition in the presence of an azo-based compound.

[8] The process for producing photochromic optical materials according to [3], in which the polymerizable monomer (a1) is at least one selected from divinylbenzene, diisopropenylbenzene, trivinylbenzene, and divinylnaphthalene.

[9] The process for producing photochromic optical materials according to [3], in which the polymerizable monomer (a2) is at least one selected from polymerizable monomers represented by the following general formula (4);

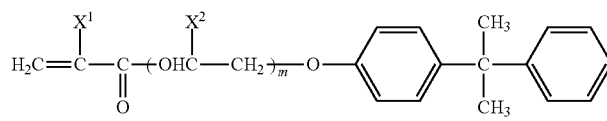

wherein, in formula (4), $X^1$ is a hydrogen atom or a methyl group, and a plurality of $X^1$ may be the same as or different from each other. $X^2$ is a hydrogen atom or a methyl group, and a plurality of $X^2$ may be the same as or different from each other. m and n are integers which satisfy m+n=0 to 8.

[10] The process for producing photochromic optical materials according to [4], in which the ethylene-based unsaturated polymerizable monomer having one (meth)acrylic group is at least one selected from aromatic (meth)acrylic acid esters represented by the following general formula (5);

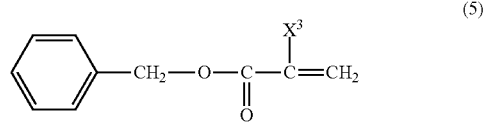

wherein, in formula (5), $X^3$ is a hydrogen atom or a methyl group.

[11] The process for producing photochromic optical materials according to any one of [1] to [10], in which the polythiol (B) is at least one selected from the group consisting of 4-mercaptomethyl-1,8-dimercapto-3,6-dithiaoctane, 4,8-, 4,7-, or 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[12] The process for producing photochromic optical materials according to any one of [1] to [11], in which the photochromic compound (C) is represented by the following general formula (9);

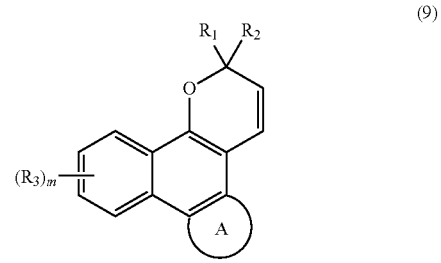

wherein, in the formula, $R_1$ and $R_2$ may be the same as or different from each other, and each of $R_1$ and $R_2$ independently represents a hydrogen atom;

a linear or branched alkyl group having 1 to 12 carbon atoms;

a cycloalkyl group having 3 to 12 carbon atoms;

a substituted or unsubstituted aryl group having 6 to 24 carbon atoms or a substituted or unsubstituted heteroaryl group having 4 to 24 carbon atoms (which, as a substituent, has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an —$NH_2$ group, an —NHR group, or a —$N(R)_2$ group (R is a linear or branched alkyl group having 1 to 6 carbon atoms. In a case where two Rs are present, the two Rs may be the same as or different from each other), a methacryloyl group, and an acryloyl group); or an aralkyl or heteroaralkyl group (a linear or branched alkyl group having 1 to 4 carbon atoms is substituted with an aryl group or a heteroaryl group), $R_3$s may be the same as or different from each other, and each $R_3$s independently represents a halogen atom;

a linear or branched alkyl group having 1 to 12 carbon atoms;

a cycloalkyl group having 3 to 12 carbon atoms;
a linear or branched alkoxy group having 1 to 12 carbon atoms;
a linear or branched haloalkyl group having 1 to 12 carbon atoms which is substituted with at least one halogen atom, a linear or branched halocycloalkyl group having 3 to 12 carbon atoms which is substituted with at least one halogen atom, a linear or branched haloalkoxy group having 1 to 12 carbon atoms which is substituted with at least one halogen atom;
an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group as a substituent);
an aralkyl or heteroaralkyl group (a linear or branched alkyl group having 1 to 4 carbon atoms is substituted with the aryl group or the heteroaryl group);
a substituted or unsubstituted phenoxy or naphthoxy group (which has at least one substituent selected from a linear or branched alkyl group or alkoxy group having 1 to 6 carbon atoms as a substituent);
—$NH_2$, —NHR, —$CONH_2$, or —CONHR (R is a linear or branched alkyl group having 1 to 6 carbon atoms); or
—$OCOR_8$ or —$COOR_8$ (here, $R_8$ is a linear or branched alkyl group having 1 to 6 carbon atoms, a cycloalkyl group having 3 to 6 carbon atoms, or in $R_1$ and $R_2$, a phenyl group which is substituted with at least one substituent of a substituted aryl group or a substituted heteroaryl group or an unsubstituted phenyl group);
m is an integer of 0 to 4;
A represents an annelated ring represented by the above formula ($A_2$) or ($A_4$);

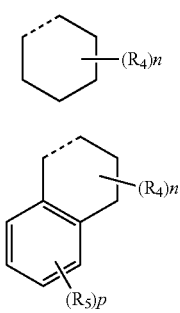

wherein, in these annelated rings, a dotted line represents a $C_5$-$C_6$ bond of the naphthopyran ring in general formula (9);
an α bond of an annelated ring ($A_4$) can be normally bonded to the $C_5$ or $C_6$ of the naphthopyran ring in general formula (9);
$R_4$'s are the same as or different from each other, and each $R_4$'s independently represents OH or an linear or branched alkyl group or alkoxy group having 1 to 6 carbon atoms, or two $R_4$'s form a carbonyl group (CO);

$R_5$ represents a halogen atom;
a linear or branched alkyl group having 1 to 12 carbon atoms;
a linear or branched haloalkyl group having 1 to 6 carbon atoms which is substituted with at least one halogen atom;
a cycloalkyl group having 3 to 12 carbon atoms;
a linear or branched alkoxy group having 1 to 6 carbon atoms;
a substituted or unsubstituted phenyl or benzyl group (which has at least one of substituents described above in the definition of $R_1$ and $R_2$ groups as a substituent in a case where each of $R_1$ and $R_2$ groups in general formula (9) independently corresponds to an aryl or heteroaryl group);
—$NH_2$ or —NHR (here, R is a linear or branched alkyl group having 1 to 6 carbon atoms); a substituted or unsubstituted phenoxy or naphthoxy group (which has at least a linear or branched alkyl group or alkoxy group having 1 to 6 carbon atoms as a substituent); or a —$COR_9$, —$COOR_9$, or —$CONHR_9$ group (here, $R_9$ represents a linear or branched alkyl group having 1 to 6 carbon atoms, a cycloalkyl group having 3 to 6 carbon atoms, or a substituted or unsubstituted phenyl or benzyl group (which has at least one of substituents described above in the definition of $R_1$ and $R_2$ groups as a substituent in a case where each of $R_1$ and $R_2$ groups in general formula (9) independently corresponds to an aryl or heteroaryl group)); and
in a case where A represents ($A_4$), n is an integer of 0 to 2, and p is an integer of 0 to 4, and in a case where A represents ($A_2$), n is an integer of 0 to 2).

[13] A photochromic optical material obtained by the process according to any one of [1] to [12].

[14] A plastic lens formed of the optical material according to [13].

The invention claimed is:
1. A process for producing photochromic optical materials, comprising:
   a step (i) of reacting at least one polymerizable monomer (A) having two or more ethylene-based unsaturated groups with at least one polythiol (B) having two or more mercapto groups to obtain a prepolymer;
   a step (ii) of mixing the prepolymer and a photochromic compound (C) to obtain a polymerizable composition; and
   a step (iii) of polymerizing the polymerizable composition,
   wherein, before the reaction of the step (i), the molar number of the mercapto groups included in the polythiol (B) is smaller than the molar number of the ethylene-based unsaturated groups included in the polymerizable monomer (A).

2. The process for producing photochromic optical materials according to claim 1,
   wherein, before the reaction of the step (i), the molar number of the mercapto groups included in the polythiol (B) is equal to or less than 0.3 times with respect to the molar number of the entirety of ethylene-based unsaturated groups included in the polymerizable monomer (A).

3. The process for producing photochromic optical materials according to claim 1,
   wherein the polymerizable monomer (A) includes at least one ethylene-based unsaturated polymerizable monomer (a1) having two or more vinyl groups or isopropenyl groups and/or at least one ethylene-based unsaturated polymerizable monomer (a2) having two or more (meth)acrylic groups.

4. The process for producing photochromic optical materials according to claim 1, wherein, in the step (i) or (ii), an ethylene-based unsaturated polymerizable monomer (D) having one (meth) acrylic group is included.

5. The process for producing photochromic optical materials according to claim 1,
wherein, in the step (i), the polymerizable monomer (A) reacts with the polythiol (B) in the presence of a phosphine-based compound.

6. The process for producing photochromic optical materials according to claim 1,
wherein the step (ii) is a step of mixing the prepolymer, the photochromic compound (C), and an azo-based compound.

7. The process for producing photochromic optical materials according to claim 6,
wherein the step (iii) is a step of polymerizing the polymerizable composition in the presence of an azo-based compound.

8. The process for producing photochromic optical materials according to claim 3,
wherein the polymerizable monomer (a1) is at least one selected from divinylbenzene, diisopropenylbenzene, trivinylbenzene, and divinylnaphthalene.

9. The process for producing photochromic optical materials according to claim 3,
wherein the polymerizable monomer (a2) is at least one selected from polymerizable monomers represented by the following general formula (4);

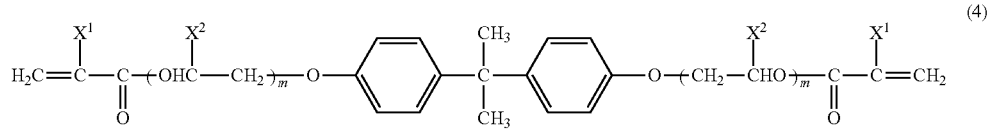

(4)

wherein, in formula (4), each of m and n is 0 or greater number, and m and n satisfy m+n=0 to 50; $X^1$ is a hydrogen atom or a methyl group, and a plurality of $X^1$ may be the same as or different from each other; $X^2$ is a hydrogen atom or an alkyl group having 1 or 2 carbon atoms, and a plurality of $X^2$ may be the same as or different from each other.

10. The process for producing photochromic optical materials according to claim 4,
wherein the ethylene-based unsaturated polymerizable monomer (D) is at least one selected from aromatic (meth)acrylic acid esters represented by the following general formula (5);

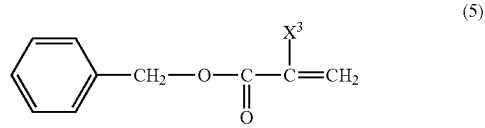

(5)

wherein, in formula (5), $X^3$ is a hydrogen atom or a methyl group.

11. The process for producing photochromic optical materials according to according to claim 1,
wherein the polythiol (B) is at least one selected from the group consisting of 4-mercaptomethyl-1,8-dimercapto-3,6-dithiaoctane, 4,8, 4,7, or 5,7-dimercaptomethyl-1, 11-dimercapto-3,6,9-trithiaundecane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

12. The process for producing photochromic optical materials according to claim 1,
wherein the photochromic compound (C) is represented by the following general formula (7) or (8);

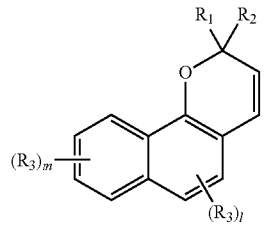

(7)

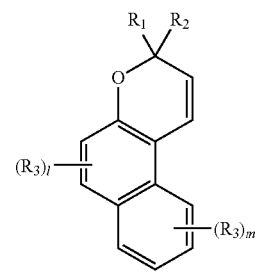

(8)

wherein, in formulas (7) and (8),
$R_1$ and $R_2$ may be the same as or different from each other, and each of $R_1$ and $R_2$ independently represents
a hydrogen atom;
a linear or branched alkyl group having 1 to 12 carbon atoms;
a cycloalkyl group having 3 to 12 carbon atoms;
a substituted or unsubstituted aryl group having 6 to 24 carbon atoms or a substituted or unsubstituted heteroaryl group having 4 to 24 carbon atoms,
wherein the substituted aryl group or the substituted heteroaryl group, as a substituent, has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, an —NH$_2$ group, an —NHR group, a —N(R)$_2$ group, wherein R is a linear or branched alkyl group having 1 to 6 carbon atoms, and in a case where two R's are present, the two R's may be the same as or different from each other,
a methacryloyl group, and an acryloyl group; or
an aralkyl or heteroaralkyl group which is formed by substituting a linear or branched alkyl group having 1 to 4 carbon atoms with an aryl group or a heteroaryl group, $R_3$'s may be the same as or different from each other, and each $R^3$'s independently represents
a halogen atom;
a linear or branched alkyl group having 1 to 12 carbon atoms;
a cycloalkyl group having 3 to 12 carbon atoms;
a linear or branched alkoxy group having 1 to 12 carbon atoms;
a linear or branched haloalkyl group having 1 to 12 carbon atoms which is substituted with at least one halogen atom, a linear or branched halocycloalkyl group having 3 to 12 carbon atoms which is substituted with at least one halogen atom, a linear or branched haloalkoxy group having 1 to 12 carbon atoms which is substituted with at least one halogen atom;
an aryl group having 6 to 24 carbon atoms or a heteroaryl group having 4 to 24 carbon atoms which is substituted or unsubstituted,
wherein the substituted aryl group or the substituted heteroaryl group has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group as a substituent;
an aralkyl or heteroaralkyl group which is formed by substituting a linear or branched alkyl group having 1 to 4 carbon atoms with the aryl group or the heteroaryl group;
a substituted or unsubstituted phenoxy or naphthoxy group, wherein the substituted phenoxy or the substituted naphthoxy group has at least one substituent selected from a linear or branched alkyl group or alkoxy group having 1 to 6 carbon atoms as a substituent;
—$NH_2$, —NHR, —$CONH_2$, or —CONHR, wherein R is a linear or branched alkyl group having 1 to 6 carbon atoms; or
—$OCOR_8$ or —$COOR_8$, wherein $R_8$ is a linear or branched alkyl group having 1 to 6 carbon atoms, a cycloalkyl group having 3 to 6 carbon atoms, or a phenyl group which is substituted with at least one substituent of a substituted aryl group or a substituted heteroaryl group in $R_1$ and $R_2$ or an unsubstituted phenyl group, and
one or more aromatic ring groups or non-aromatic ring groups are formed by bonding of at least two adjacent $R_3$'s to each other and by including the carbon atom to which $R_3$ is bonded, wherein the aromatic ring group or non-aromatic ring group includes one ring or two annelated rings which may include a heteroatom selected from the group consisting of oxygen, sulfur, and nitrogen;
l is an integer 0 to 2; and
m is an integer 0 to 4.

13. The process for producing photochromic optical materials according to claim 12,
wherein the photochromic compound (C) is represented by the following general formula (9);

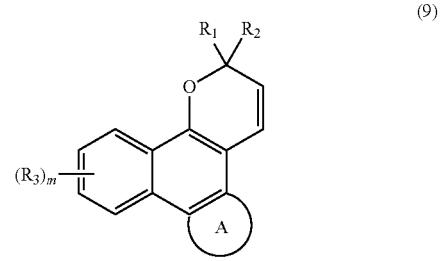

wherein, in formula (9), each of $R_1$, $R_2$, and R3 has the same meaning as that in formula (7);
A represents an annelated ring represented by the above formula ($A_2$) or ($A_4$);

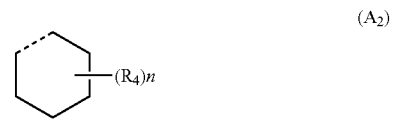

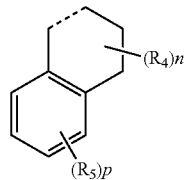

wherein, in these annelated rings, a dotted line represents a $C_5$-$C_6$ bond of the naphthopyran ring in general formula (9);
an α bond of an annelated ring ($A_4$) can be normally bonded to the $C_5$ or $C_6$ of the naphthopyran ring in general formula (9);
$R_4$'s are the same as or different from each other, and each $R_4$'s independently represents OH or an linear or branched alkyl group or alkoxy group having 1 to 6 carbon atoms, or two $R_4$'s form a carbonyl group (CO);
$R_5$ represents a halogen atom;
a linear or branched alkyl group having 1 to 12 carbon atoms;
a linear or branched haloalkyl group having 1 to 6 carbon atoms which is substituted with at least one halogen atom;
a cycloalkyl group having 3 to 12 carbon atoms;
a linear or branched alkoxy group having 1 to 6 carbon atoms;
a substituted or unsubstituted phenyl or benzyl group, wherein the substituted phenyl or the substituted benzyl group has at least one of substituents described above in the definition of $R_1$ and $R_2$ groups as a substituent in a case where each of $R_1$ and $R_2$ groups in general formula (9) independently corresponds to an aryl or heteroaryl group;
—$NH_2$ or —NHR, wherein R is a linear or branched alkyl group having 1 to 6 carbon atoms;
a substituted or unsubstituted phenoxy or naphthoxy group, wherein the substituted phenoxy or the substituted naphthoxy group has at least a linear or branched alkyl group or alkoxy group having 1 to 6 carbon atoms as a substituent; or
a —$COR_9$, —$COOR_9$, or —$CONHR_9$ group, wherein $R_9$ represents a linear or branched alkyl group having 1 to 6 carbon atoms, a cycloalkyl group having 3 to 6 carbon atoms, or a substituted or unsubstituted phenyl or benzyl group, wherein the substituted phenyl or the substituted benzyl group has at least one of substituents described above in the definition of $R_1$ and $R_2$ groups as a substituent in a case where each of $R_1$ and $R_2$ groups in general formula (9) independently corresponds to an aryl or heteroaryl group; and in a case where A represents ($A_4$), n is an integer of 0 to 2, p is an integer of 0 to 4, and in a case where A represents ($A_2$), n is an integer of 0 to 2.

14. A photochromic optical material obtained by the process according to claim 1.

15. A plastic lens formed of the optical material according to claim 14.

* * * * *